United States Patent [19]

Miura et al.

[11] Patent Number: 4,566,002
[45] Date of Patent: Jan. 21, 1986

[54] DATA OUTPUT APPARATUS CAPABLE OF ROTATING DATA OUTPUT THEREFROM RELATIVE TO DATA INPUT THERETO

[75] Inventors: Genmei Miura, Tokyo; Akira Konno, Sayama; Motofumi Konishi, Yokohama, all of Japan

[73] Assignee: Canon Kabushiki Kaisha, Tokyo, Japan

[21] Appl. No.: 450,352

[22] Filed: Dec. 16, 1982

Related U.S. Application Data

[63] Continuation of Ser. No. 134,221, Mar. 26, 1980, abandoned.

[30] Foreign Application Priority Data

Mar. 30, 1979 [JP] Japan .................................. 54-39076
May 8, 1979 [JP] Japan .................................. 54-56539
May 8, 1979 [JP] Japan .................................. 54-56540

[51] Int. Cl.⁴ .................................................. G09G 3/20
[52] U.S. Cl. .................................. 340/727; 340/735; 340/731; 340/750; 178/30
[58] Field of Search .................. 340/727, 723, 724, 750, 340/735; 364/518, 520, 521, 522, 523; 358/263, 280; 178/30

[56] References Cited

U.S. PATENT DOCUMENTS

| | | |
|---|---|---|
| 3,255,313 | 6/1966 | Hell . |
| 3,634,828 | 1/1972 | Myers .................................. 364/200 |
| 3,893,100 | 1/1975 | Stein .................................. 340/731 |
| 3,924,225 | 12/1975 | Langnickel .......................... 178/30 |
| 3,976,982 | 8/1976 | Eiselen ................................ 340/727 |
| 3,991,868 | 11/1976 | Robinson ............................. 178/30 |
| 4,059,833 | 11/1977 | Kitamura ............................ 346/108 |
| 4,079,367 | 3/1978 | Yonezawa ........................... 178/30 |
| 4,079,458 | 3/1978 | Rider .................................. 340/750 |
| 4,084,195 | 4/1978 | Pereira ................................ 358/263 |
| 4,107,662 | 8/1978 | Endo ................................... 340/731 |
| 4,107,786 | 8/1978 | Masaki ................................ 364/900 |
| 4,163,229 | 7/1979 | Bodin et al. ........................ 340/735 |
| 4,168,488 | 9/1979 | Evans ................................. 340/744 |
| 4,225,929 | 9/1980 | Ikeda ................................. 340/727 |
| 4,242,678 | 12/1980 | Sommerville ...................... 340/731 |
| 4,254,416 | 3/1981 | Lelke .................................. 178/30 |
| 4,257,042 | 3/1981 | Lindemann et al. .............. 340/727 |
| 4,271,476 | 6/1981 | Lotspiech .......................... 340/727 |
| 4,312,045 | 1/1982 | Jean et al. .......................... 340/727 |

Primary Examiner—Gerald L. Brigance
Attorney, Agent, or Firm—Fitzpatrick, Cella, Harper & Scinto

[57] ABSTRACT

A data output apparatus is capable of effecting a rotation of image data output therefrom relative to image data input thereto. This apparatus includes a system for scanning image data to be input thereto on a line by line basis, and a page memory for storing this input data on this basis. A control system converts the data stored in the page memory on a line by line basis to data for storage on a column by column basis. A column memory receives the data arranged on a column by column basis from the control system and an output device connected to the column memory puts out the data therefrom on the column by column basis. More particularly, the memories may comprise a unit matrix group including a plurality of unit matrix memories, all of which are accessible at the same time. An address selecting circuit sequentially selects the unit matrix memories, along one readout direction, to be sequentially read out and digit lines are provided for putting out data from the unit matrix memories. A digit selection circuit then selects the digit lines sequentially in accordance with the direction in which data is to be read out.

43 Claims, 38 Drawing Figures

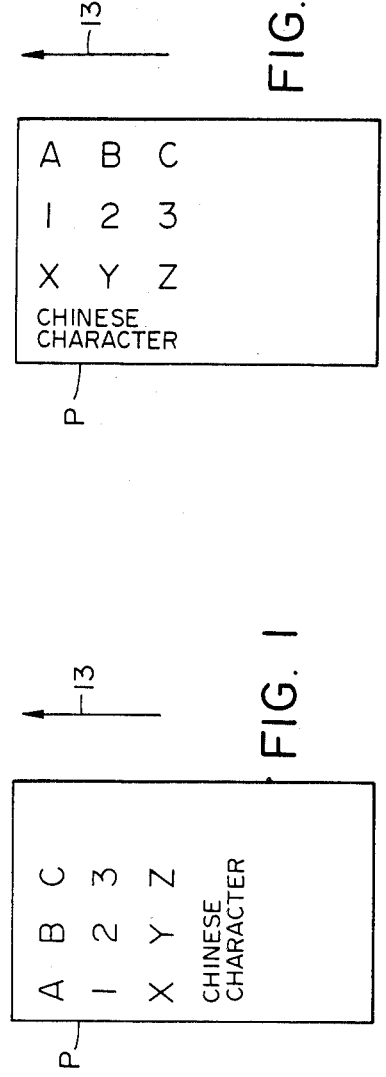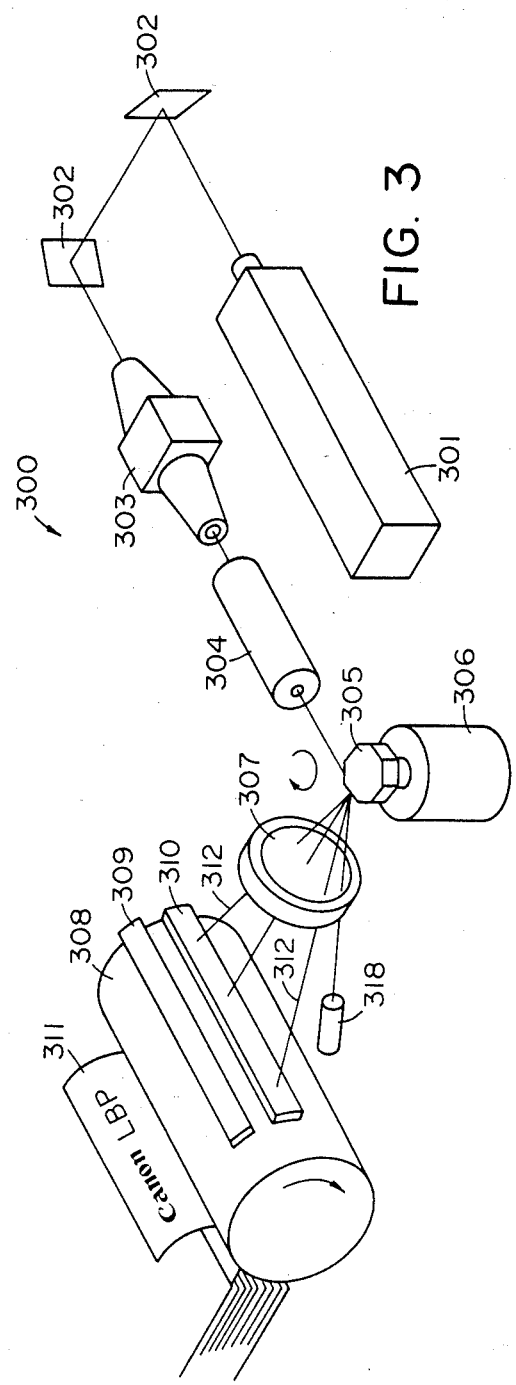

VERTICAL MODE CLOCK NO.

| | $C_0$ $C_1$ $C_2$ $C_3$ | $C_4$ $C_5$ $C_6$ $C_7$ | $C_8$ $C_9$ $C_{10}$ $C_{11}$ | $C_{12}$ $C_{13}$ $C_{14}$ $C_{15}$ | |
|---|---|---|---|---|---|
| $\ell_0$ | 0 0 0 0 | 0 0 0 0 | 0 0 0 0 | 0 0 0 0 | $C_{31}$ |
| $\ell_1$ | 0 0 0 0 | 0 0 0 0 | 0 0 0 0 | 0 0 0 0 | $C_{30}$ |
| $\ell_2$ | 0 0 0 0 | 0 0 0 0 | 0 0 0 0 | 0 0 0 0 | $C_{29}$ |
| $\ell_3$ | 0 0 0 0 | 0 0 0 0 | 0 0 0 0 | 0 0 0 0 | $C_{28}$ |
| $\ell_4$ | 0 0 0 0 | 0 0 0 0 | 0 0 0 0 | 0 0 0 0 | $C_{27}$ |
| $\ell_5$ | 0 0 0 0 | 0 0 0 0 | 0 0 0 0 | 0 0 0 0 | $C_{26}$ |
| $\ell_6$ | 0 0 0 0 | 0 0 0 0 | 0 0 0 0 | 0 0 0 0 | $C_{25}$ |
| $\ell_7$ | 0 0 0 0 | 0 0 0 0 | 0 0 0 0 | 0 0 0 0 | $C_{24}$ |
| $\ell_8$ | 0 0 0 0 | 0 0 0 0 | 0 0 0 0 | 0 0 0 0 | $C_{23}$ |
| $\ell_9$ | 0 0 0 0 | 0 0 0 0 | 0 0 0 0 | 0 0 0 0 | $C_{22}$ |
| $\ell_{10}$ | 0 1 1 1 | 1 1 1 1 | 1 1 1 1 | 1 0 0 0 | $C_{21}$ |
| $\ell_{11}$ | 0 1 1 1 | 1 1 1 1 | 1 1 1 1 | 1 1 0 0 | $C_{20}$ |
| $\ell_{12}$ | 0 1 1 0 | 0 0 0 0 | 0 0 0 1 | 1 1 1 0 | $C_{19}$ |
| $\ell_{13}$ | 0 1 1 0 | 0 0 0 0 | 0 0 0 0 | 1 1 1 0 | $C_{18}$ |
| $\ell_{14}$ | 0 1 1 0 | 0 0 0 0 | 0 0 0 0 | 0 1 1 0 | $C_{17}$ |
| $\ell_{15}$ | 0 1 1 0 | 0 0 0 0 | 0 0 0 0 | 0 1 1 0 | $C_{16}$ |
| $\ell_{16}$ | 0 1 1 0 | 0 0 0 0 | 0 0 0 0 | 1 1 1 0 | $C_{15}$ |
| $\ell_{17}$ | 0 1 1 0 | 0 0 0 0 | 0 0 0 1 | 1 1 0 0 | $C_{14}$ |
| $\ell_{18}$ | 0 1 1 1 | 1 1 1 1 | 1 1 1 1 | 1 1 0 0 | $C_{13}$ |
| $\ell_{19}$ | 0 1 1 1 | 1 1 1 1 | 1 1 1 1 | 1 0 0 0 | $C_{12}$ |
| $\ell_{20}$ | 0 1 1 0 | 0 0 0 0 | 0 0 0 0 | 0 0 0 0 | $C_{11}$ |
| $\ell_{21}$ | 0 1 1 0 | 0 0 0 0 | 0 0 0 0 | 0 0 0 0 | $C_{10}$ |
| $\ell_{22}$ | 0 1 1 0 | 0 0 0 0 | 0 0 0 0 | 0 0 0 0 | $C_9$ |
| $\ell_{23}$ | 0 1 1 0 | 0 0 0 0 | 0 0 0 0 | 0 0 0 0 | $C_8$ |
| $\ell_{24}$ | 0 1 1 0 | 0 0 0 0 | 0 0 0 0 | 0 0 0 0 | $C_7$ |
| $\ell_{25}$ | 0 1 1 0 | 0 0 0 0 | 0 0 0 0 | 0 0 0 0 | $C_6$ |
| $\ell_{26}$ | 0 1 1 0 | 0 0 0 0 | 0 0 0 0 | 0 0 0 0 | $C_5$ |
| $\ell_{27}$ | 0 1 1 0 | 0 0 0 0 | 0 0 0 0 | 0 0 0 0 | $C_4$ |
| $\ell_{28}$ | 0 0 0 0 | 0 0 0 0 | 0 0 0 0 | 0 0 0 0 | $C_3$ |
| $\ell_{29}$ | 0 0 0 0 | 0 0 0 0 | 0 0 0 0 | 0 0 0 0 | $C_2$ |
| $\ell_{30}$ | 0 0 0 0 | 0 0 0 0 | 0 0 0 0 | 0 0 0 0 | $C_1$ |
| $\ell_{31}$ | 0 0 0 0 | 0 0 0 0 | 0 0 0 0 | 0 0 0 0 | $C_0$ |

$\ell_0$ $\ell_1$ $\ell_2$ $\ell_3$ $\ell_4$ $\ell_5$ $\ell_6$ $\ell_7$ $\ell_8$ $\ell_9$ $\ell_{10}$ $\ell_{11}$ $\ell_{12}$ $\ell_{13}$ $\ell_{14}$ $\ell_{15}$ VERTICAL MODE READ OUT SCAN LINE NO. (left)
HORIZONTAL MODE CLOCK NO. (right)
HORIZONTAL MODE READ OUT SCAN LINE NO. (bottom)

FIG. 18

IN VERTICAL MODE

IN HORIZONTAL MODE

| | | 1st. | | | | | | | | | | | | | | 66th. | | | | | | | |
|---|---|---|---|---|---|---|---|---|---|---|---|---|---|---|---|---|---|---|---|---|---|---|---|
| | | 0~3 | 4~7 | 8~11 | 12-15 | 16-19 | 20-23 | 24-27 | 28-31 | 0~3 | 4~7 | 8~11 | | 20-23 | 24-27 | 28-31 | 0~3 | 4~7 | 8~11 | 12-15 | 16-19 | 20-23 | 24-27 | 28-31 |

1st ROW

| | 0~3 | 28 | 24 | 20 | 16 | 12 | 8 | 4 | 0 | 28 | 24 | 20 | 8 | 4 | 0 | 28 | 24 | 20 | 16 | 12 | 8 | 4 | 0 |
| 4~7 | 29 | 25 | 21 | 17 | 8581 | 13 | 9 | 5 | 1 | 29 | 25 | 21 | 9 | 5 | 1 | 29 | 25 | 21 | 17 | 1 | 13 | 9 | 5 | 1 |
| 8~11 | 30 | 26 | 22 | 18 | 14 | 10 | 6 | 2 | 30 | 26 | 22 | | 8449 | | 133 | 6 | 2 | 30 | 26 | 22 | 18 | 14 | 10 | 6 | 2 |
| 12~15 | 31 | 27 | 23 | 19 | 15 | 11 | 7 | 3 | 31 | 27 | 23 | 11 | 7 | 3 | 31 | 27 | 23 | 19 | 15 | 11 | 7 | 3 |

2nd ROW

| 0~3 | 28 | 24 | 20 | 16 | 12 | 8 | 4 | 0 | 28 | 24 | 20 | 8 | 4 | 0 | 28 | 24 | 20 | 16 | 12 | 8 | 4 | 0 |
| 4~7 | 29 | 25 | 21 | 17 | 8582 | 13 | 9 | 5 | 1 | 29 | 25 | 21 | 9 | 5 | 1 | 29 | 25 | 21 | 17 | 2 | 13 | 9 | 5 | 1 |
| 8~11 | 30 | 26 | 22 | 18 | 14 | 10 | 6 | 2 | 30 | 26 | 22 | 8450 | 134 | 6 | 2 | 30 | 26 | 22 | 18 | 14 | 10 | 6 | 2 |
| 12~15 | 31 | 27 | 23 | 19 | 15 | 11 | 7 | 3 | 31 | 27 | 23 | 11 | 7 | 3 | 31 | 27 | 23 | 19 | 15 | 11 | 7 | 3 |

| 0~3 | 28 | 24 | 20 | 16 | 12 | 8 | 4 | 0 | 28 | 24 | 20 | 8 | 4 | 0 | 28 | 24 | 20 | 16 | 12 | 8 | 4 | 0 |
| 4~7 | 29 | 25 | 21 | 17 | 8583 | 13 | 9 | 5 | 1 | 29 | 25 | 21 | 8451 | 9 | 5 | 135 | 1 | 29 | 25 | 21 | 17 | 3 | 13 | 9 | 5 | 1 |

FIG. 25B

| $L_1$ | $L_0$ | A | B | C | D | E | F | G | H |
|---|---|---|---|---|---|---|---|---|---|
| 0 | 0 | 0 | ON | | | | | | |
| 0 | 0 | 1 | | ON | | | | | | |
| 0 | 1 | 0 | | | ON | | | | | |
| 0 | 1 | 1 | | | | ON | | | | |
| 1 | 0 | 0 | | | | | ON | | | |
| 1 | 0 | 1 | | | | | | ON | | |
| 1 | 1 | 0 | | | | | | | ON | |
| 1 | 1 | 1 | | | | | | | | ON |

| $C_1$ | $C_0$ | A | B | C | D |
|---|---|---|---|---|---|
| 0 | 0 | ON | | | |
| 0 | 1 | | ON | | |
| 1 | 0 | | | ON | |
| 1 | 1 | | | | ON |

DATA OUTPUT APPARATUS CAPABLE OF ROTATING DATA OUTPUT THEREFROM RELATIVE TO DATA INPUT THERETO

This is a continuation of application Ser. No. 134,221, filed Mar. 26, 1980, now abandoned.

BACKGROUND OF THE INVENTION

1. Field of the Invention

The present invention relates to data output apparatus for recording or displaying data such as character, symbol, figure etc. data and also to a character pattern generator for rotating a dot pattern expressed as a matrix at the time of recording or displaying the data.

2. Description of the Prior Art

Various types of output apparatus for page data have been proposed and also are under development which use an electrostatic recording system employing, for example, a laser beam or optical fiber, ink jet recording system or CRT display system.

In such type of apparatus, some page data are put into the apparatus in a constant and successive line by line fashion from input means such as magnetic tape. The input data are stored in memory and the stored data are sequentially taken up line by line to produce character codes continuously and sequentially for every line relative to the sweeping direction of scanning means such as laser beam. In response to the character code a necessary character signal is generated to record the character on a recording medium such as recording paper.

Therefore, with the known recording apparatus, recording of literal data is performed line by line in the direction intersecting at a right angle the moving direction of recording medium P (secondary scan direction 13) as shown in FIG. 1. This recording mode is hereinafter referred to as vertical mode.

However, sometimes it is desirable to make the literal data recorded on a recording medium line by line in the direction parallel to the moving direction of the recording medium as shown in FIG. 2. This recording mode is hereinafter referred to as horizontal mode. Of course there may occur such case in which it is wished to convert the horizontal mode to the vertical mode.

All the known recording apparatus lack ability to perform such conversion of data arrangement with respect to a page line, which has given the user much inconvenience. Another disadvantage involved in such known recording apparatus is the inability to carry out recording at high speed and continuously from one page to the next page. When the memory has only one page capacity, it is impossible to start recording of one page immediately after completion of recording a prior page.

To change over the direction of page data arrangement from one to another mode relative to the moving direction of recording medium P, the dot pattern of character obtained by the characters generator must be displaced by a certain rotation angle. The method hitherto used to rotate the dot pattern is to conduct a matrix operation with software. However, this known method involves many processing steps and therefore it is impossible to attain a high speed rotation of the dot pattern.

In most apparatus for recording or displaying characters, the dot pattern of characters usually has directivity (vertical mode or horizontal mode). Therefore, for such character display apparatus capable of working in both of a vertical mode and a horizontal mode it is required to provide the apparatus with two kinds of character dot patterns, one for the vertical mode and the other for the horizontal mode. This means that the capacity of memory must be doubled. Therefore, the number of memories necessary for such a character display system capable of working in both modes is inevitably increased which is undesirable in view of economy.

SUMMARY OF THE INVENTION

Accordingly, it is an object of the invention to provide a data output apparatus which eliminates the above mentioned disadvantages involved in the apparatus according to the prior art.

It is a more specific object of the invention to provide a data output apparatus which receives page data row by row, stores the data row by row in a memory part having a capacity large enough to store at least one page amount of data and carries out, at the time of recording or displaying, a column conversion of the data so that said page data may be recorded or displayed column by column.

It is another object of the invention to provide a data output apparatus which enables continuous and high speed recording by receiving the next page data while output of a page data.

It is a further object of the invention to provide a character pattern generator which is able to carry out the above-mentioned rotation of a dot pattern with hardware at a higher speed and which is able to convert a character dot pattern stored in the arrangement, for example, for the vertical (or horizontal) mode into such character dot pattern suitable for recording in the horizontal (or vertical) mode.

It is still a further object of the invention to provide a character pattern generator which enables characters of any desired size to be obtained in a simple manner.

Other and further objects, features and advantages of the invention will appear more fully from the following description taken in connection with the accompanying drawings.

BRIEF DESCRIPTION OF THE DRAWINGS

FIGS. 1 and 2 illustrate recording in the vertical mode and the horizontal mode respectively;

FIG. 3 is a perspective view of a recording apparatus of the type employing a laser beam;

Figures 8, 9, 10:
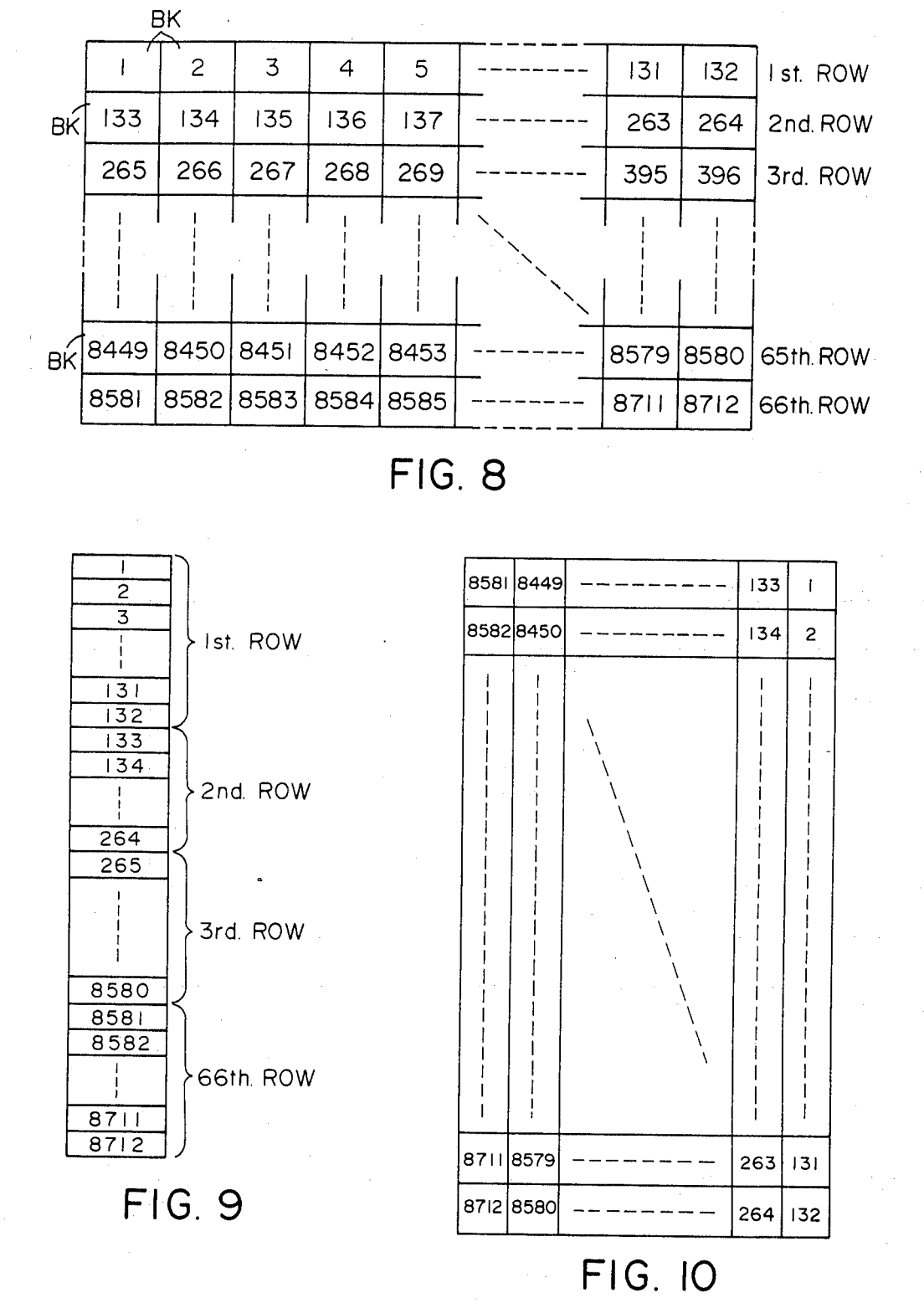

FIGS. 8 through 10 illustrate the manner of column conversion;

FIG. 18 shows the content of memory obtained when a character "P" was put into the matrix group shown in FIG. 17;

FIGS. 19A and 19B show the contents of two memory parts A and B corresponding to the content shown in FIG. 18;

FIG. 24 shows the sequence of unit matrix selection in vertical mode;

FIGS. 25A and 25B are related;

FIGS. 25A and 25B shows the sequence of unit matrix selection in horizontal mode;

FIGS. 28A and 28B are related;

FIGS. 28A and 28B shows a memory matrix group illustrating the function of character size variation.

FIGS. 29A and 29B are block diagram of control in a character generator having the function of character size variation.

DESCRIPTION OF THE PREFERRED EMBODIMENTS

Figure 4:
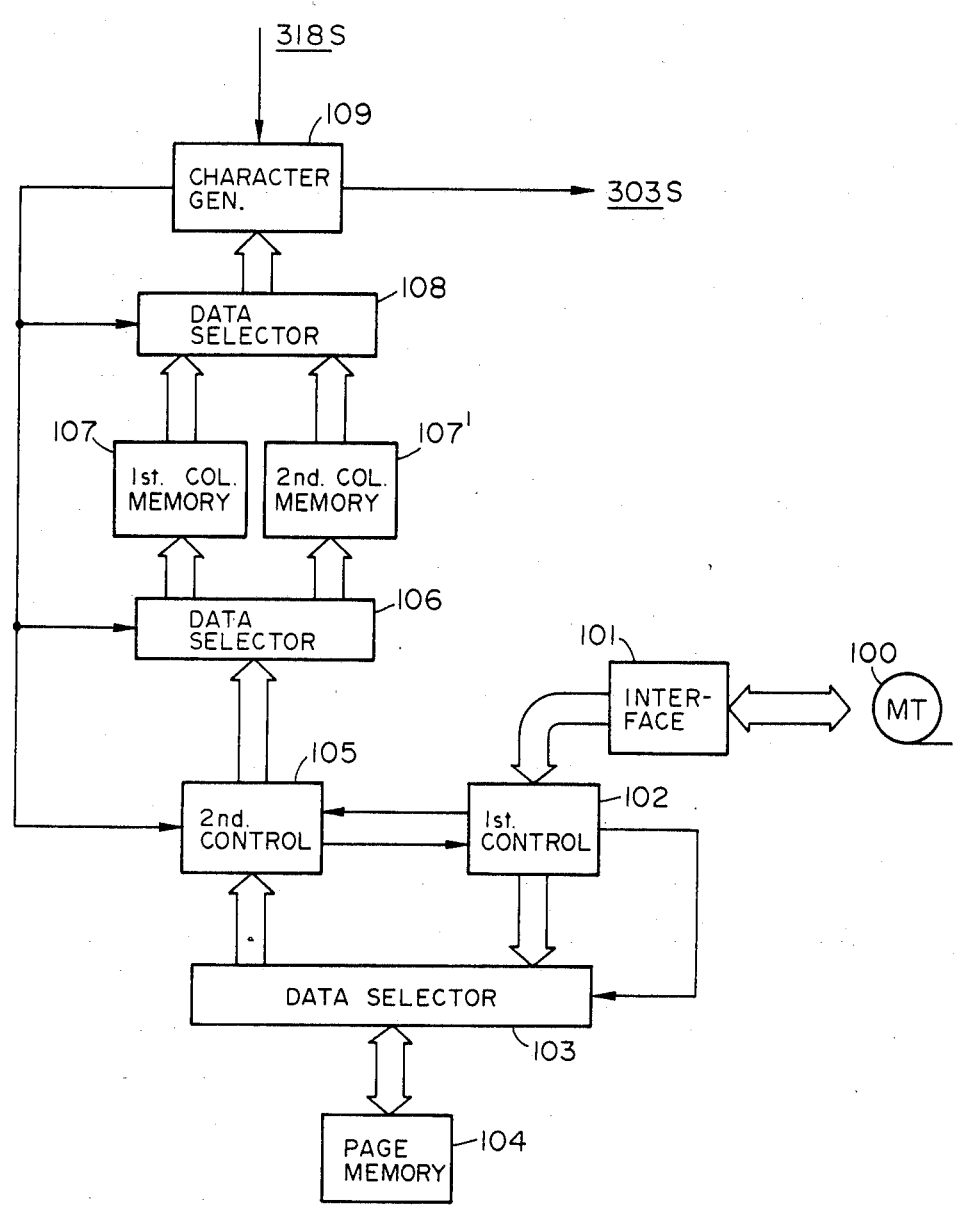
FIG. 4 is a block diagram of the first control in the recording apparatus shown in FIG. 3.

FIG. 3 is a schematic perspective view of a recording apparatus using a laser beam and showing an embodiment of the invention.

In the figure, a laser oscillator is designated by 301, a reflecting mirror by 302, a modulator 303, a beam expander by 304, a polygonal mirror by 305, a f·θ lens by 307 a photosensitive drum by 308 and a recording paper by 311.

A laser beam generated from the laser oscillator 301 is introduced into the input opening of the modulator 303 through the reflecting mirrors 302. The reflecting mirrors are provided to minimize the space necessary for the light path of the laser beam in the apparatus. If a sufficient space to directly introduce the laser beam into the modulator is available in the apparatus and therefore such reflecting mirrors are unnecessary, then these mirrors may be eliminated.

As the modulator 303 there may be used an acousto-optical modulator making use of the known acousto-optical effect or an electro-optical modulator making use of the known electro-optical effect.

In the modulator 303, the laser beam is modulated more or less in accordance with an input signal to the modulator 303.

If the laser oscillator 301 is a semiconductor laser, then the modulator 303 may be eliminated and the laser beam may be directly directed to the beam expander 304. This is also applicable to the cases wherein such type of gas laser is used in which a current modulation is possible or internal modulation type of laser is used which includes a modulator built in the modulation light path.

The laser beam emerging from the modulator 303 enters the beam expander 304 by which the diameter of the beam is expanded while maintaining the parallelism of rays. The expanded laser beam is incident upon the rotary polygonal mirror 305 which has one or more mirror surfaces and is mounted on a shaft supported by a high accuracy bearing such as pneumatic bearing. The polygonal mirror 305 is driven into rotation by a motor 306, rotating at a constant speed, such as a hysteresis synchronous motor or DC servo-motor. By this rotation of the polygonal mirror, the laser beam 312 is swept horizontally and then focused on the photosensitive drum 308 as a spot through a focusing lens 307 of f·θ characteristic. This f·θ characteristic is required for the following reason:

For a common focusing lens there holds the following relation between the incident angle θ and the focused position r on the image plane:

$$r = f \cdot \tan \theta \quad (1)$$

where f is the focal length of the lens.

When the laser beam is reflected by a particular polygonal rotary mirror 305 as in the case of the illustrated embodiment, the incident angle of the reflected laser beam 312 to the focusing lens 307 linearly changes with time. As a result, the moving speed of the position of spot focused on the photosensitive drum 308 serving as an image plane is not constant but changes non-linearly. Thus, the moving speed of the spot is increased at the point where the incident angle becomes larger. Therefore, if the laser beam is turned on at constant time intervals to describe a row of spots on the photosensitive drum, then it will be found that the space between spots is broader at the both end portions of the row than at the middle part of the row. To eliminate this unfavourable phenomenon, the focusing lens 307 should be designed to have the following characteristic:

$$r = f \cdot \theta \quad (2)$$

Such focusing lens 307 is generally called an f·θ lens.

On the other hand, when parallel rays are focused into a spot, the minimum spot diameter dmin is given by:

$$dmin = f(\lambda / A) \quad (3)$$

wherein,
f: focal length of the focusing lens,
λ: wavelength of the light then used, and
A: entrance aperture of the focusing lens.

As will readily be understood from the above, a smaller spot diameter dmin can be obtained by using a larger A when both of f and λ are constant. The above described beam expander 304 is provided to attain this effect of smaller spot diameter. Therefore, in case that the necessary dmin is automatically obtainable from the beam diameter of the laser oscillator, then the beam expander 304 may be eliminated.

Designated by 318 is a beam detector which comprises an entrance slit and a photo-electric transducer of high level in response time (such as PIN diode). The beam detector 318 detects the position of laser beam 312 being swept and issues a detection signal which is used to determine the timing of start of an input signal to the modulator 303 for applying desired photo data onto the photosensitive drum.

This arrangement brings forth various advantages. Deviation in signal synchronism in the horizontal direction caused by error of division accuracy of reflection surfaces in the polygonal mirror 305 as well as irregularity of its rotation can be reduced to a great extent. Thus, images of high quality can be obtained. Furthermore, a broader allowance can be given for the accuracy required for the polygonal mirror 305 and driving motor 306. This leads to a substantial reduction of manufacturing cost thereof.

The laser beam 312 deflected and modulated in the manner described above is thrown on the photosensitive drum 308 to form an electrostatic latent image. The latent image is then visualized through the processing steps of electrophotography known per se. After transferring the developed image onto a recording paper 311 and fixing the same, a hard copy is obtained.

FIG. 4 shows a form of control system useful for the laser beam printer according to the invention shown in FIG. 3.

In FIG. 4, the reference numeral 100 designates a magnetic tape (MT), 101 is an interface which receives from and delivers to MT 100 data signals, 102 is a first control and 103 is a data selector the function of which is to change over bus lines to data addresses. 104 is a page memory for storing written data (page data) in an amount of one page, 105 is a second control for column conversion of the content stored in the first memory and 106 is a data selector. 107 is a first column memory for receiving the first column one of page data inputted and column-converted by the second control 105. 107' is a second column memory for receiving the second column one of the data. 108 is a data selector and 109 is a character generator. The output signal 303S coming from the generator is put into the modulator 303 shown in FIG. 3 to form character data on the photosensitive drum 308. Designated by 318S is a signal issued from the beam detector.

Figure 5:
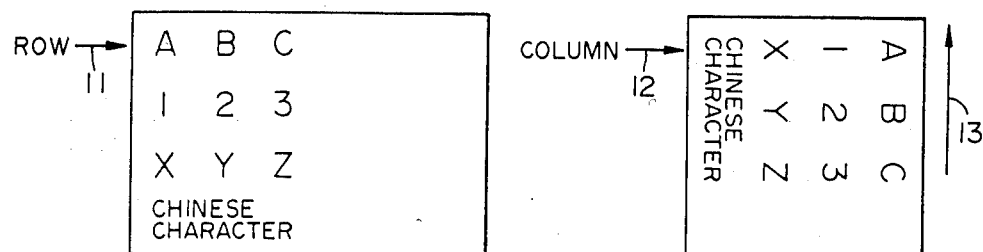
FIG. 5 shows an input form of page data.
Figure 6:
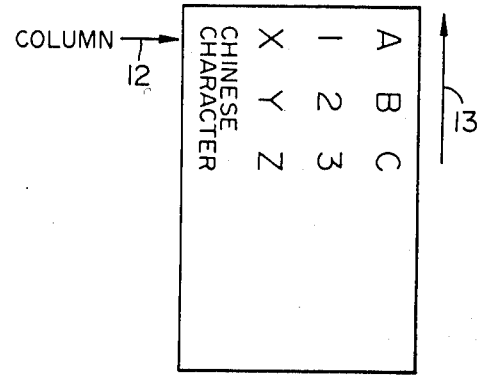
FIG. 6 shows the data recorded on a recording medium.

FIG. 5 shows an input form of page data and FIG. 6 shows the data recorded on a recording paper. The arrow 11 in FIG. 5 indicates the direction in which data input is carried out. Arrow 12 in FIG. 6 indicates the direction of data output to the recording medium (primary scanning direction) and arrow 13 indicates the moving direction of the recording medium (secondary scanning direction).

When some written data are put in successively row by row, the input data are received by the interface 101 and then supplied to the first control 102. At this time, the first control 102 so controls the data selector 103 to direct the page memory 104 to the first control. And the supplied data in every row are stored in the page memory 104 in the order of rows. In this manner, the written data contained in one page are all stored in the page memory in a form as shown in FIG. 5. When all the written data of one page have been stored in the page memory 104, the first control 102 changes over the data selector 103 so as to connect the page memory 104 to the second control 105. At the same time, an instruction signal is given to the second control to initiate printing. In response to the start instruction, the photosensitive drum 308 starts rotating and electric charge is applied to the photosensitive surface of the drum by a charger. Simultaneously, the second control 105 conducts a column conversion operation as later described in detail from the data in the page memory 104 and then transfers the first column data to the first column memory 107. In the example shown in FIGS. 5 and 6, the first column data includes " 浅 " (in Chinese character), "X", "1" and "A". At this step of operation, the data selector 106 is in the position in which the selector connects the first column memory 107 to the second control 105 whereas the data selector 108 is in the position in which it connects the second column memory 107' to the character generator 109.

The character generator 109 makes the data selectors 108 and 106 inverted in response to the first detection signal coming from the beam detector 318 within the recording apparatus so that the character generator 109 is connected with the first column memory and the second control 105 is connected with the second column memory. As a matter of course, the first column one of page data has completely been stored in the first column memory 107 until the time point. Also, an interruption has occurred from the character generator 109 to the second control 105.

Simultaneously with the above processing, the character generator 109 selects the character in the bottom row among those characters which must be recorded in the first column of a recording paper (page data) from the first column memory 107. In the shown example, the bottom character to be selected is the character of " 浅 ". And the character generator 109 issues a dot data signal of the first column relating to the selected character that is, a signal 303S. By means of the data signal 303S the modulator 303 is modulated to form on the photosensitive drum 308 a latent image corresponding to the first column dot data of the character in the bottom row of characters to be recorded in the first column of a recording paper (page data). In the same manner, the character in the second row from the bottom (which is "X" in the shown example) is selected and a first column dot data of the selected character is issued from the character generator 109. Thereby the modulator 303 is modulated so as to form a latent image thereof on the drum. This operation is repeated until the complete latent image corresponding to the first column dot data of every character (" 浅 ", "X", "1", "A") to be recorded on the recording paper in the first column has been formed and all the latent images of the characters in the first column have completely been formed. For example, if the character is formed by a 16×32 dot matrix, then the above operation is repeated 16 times irrespective of the number of characters contained in the first column of the written data.

During the time of such scanning being repeated 16 times, the second control 105 to which an interruption has already offered selects from the page memory 104 those characters to be recorded as the second column of the page data while carrying out an operation for column conversion and transfers the selected characters to the second column memory 107'. Of course, it must be assured that this operation is completed during the time of 16 scannings. At the time point when the character generator 109 has completed the formation of latent images of all the character data in the first column memory 107, that is, at the end of repeating scanning 16 times, the data selectors 106 and 108 are inverted again and at the same time an interruption is offered to the second control 105.

Now, the character generator 109 is connected to the second column memory 107' and the second control 105 is connected to the first column memory 107. In this position, a repeating operation as described above is carried out.

After many repetitions of the operation and at the time point when the formation of latent images of all the written data of one page stored in the page memory 104 has been completed, the second control 105 sends an end signal to the first control 102.

If a second reproduction is required, the first control 102 gives an instruction for starting printing. Thus, the above procedure is then repeated again.

Figure 7:
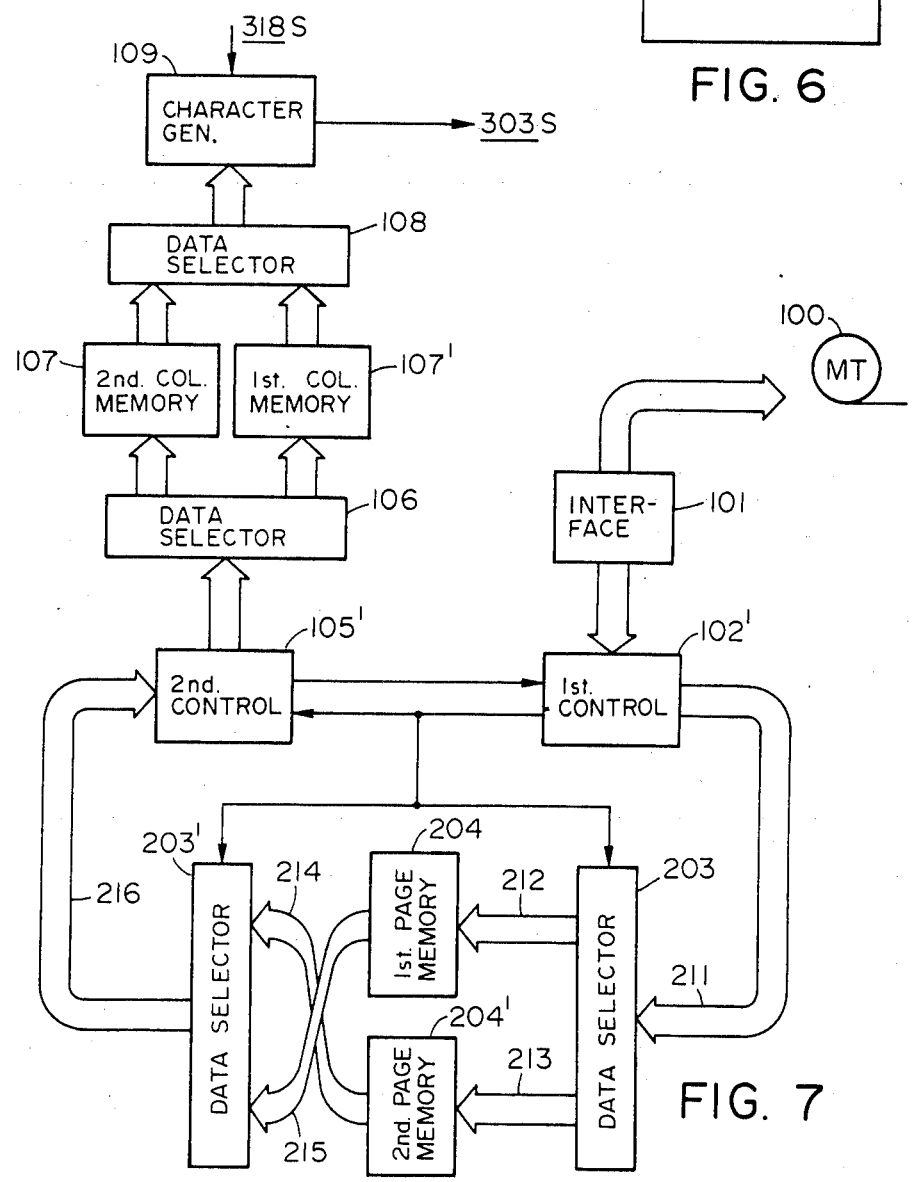
FIG. 7 is a block diagram of the second control in the apparatus shown in FIG. 3.

FIG. 7 shows another form of control block.

In FIG 7, the same reference numerals as in FIG. 4 are used to designate members having the same functions as in the embodiment shown in FIG. 4. Data selectors 203 and 203' function to change over the bus lines to data addresses. First and second page memories 204 and 204' store in each an amount of written data corresponding to one page.

When some page data are put in successively row by row, the interface 101 receives the input data and they are supplied to the first control 102'. At this time, the first control so controls the data selector 203 as to connect the data bus 211 extending from the first control 102' to the data bus 212 so that the input data are written in the first page memory 204. On the other hand, at the same time, the data selector 203' is in the position in which it connects the bus line 214 extending from the second page memory 204' to the bus line 216 extending to the second control 105'.

In this position, the data of the first page put in the apparatus row by row are sequentially stored in the first page memory 204 in a form corresponding to the input form shown in FIG. 5.

When all the data contained in the first page have completely been stored in the first page memory 204, the first control 102' changes over the selection of bus line of the data selector 203'. Now, the data selector 203' connects the bus line 215 to 216 so that the first page data previously stored in the first page memory 204 are put out into the second control 105'. The second control 105' conducts an operation for column conversion as described above with reference to FIG. 2. On the other hand, the first control 102' continues to be entirely free during the time period of from the start of control operation by the second control 105' to the end of recording operation. Accordingly, the second page memory 204' also continues to be idle during this time period. To make full use of this waiting time, therefore, the first control 102' makes the data selector 203' connect the bus line 215 to 216 and the data selector 203 connect the bus line 211 to 213. By doing so it is made possible to store the second page data in the second page memory 204' through the interface 101 by the first control 102' while the first page data previously stored in the first page memory 204 is being put out at the same time.

When the second page data have been received and upon the receipt of a confirmation of the end of recording from the second control 105', the data selectors 203 and 203' are again switched over to connect the second page memory 204' to the second control 105' and the first page memory 204 to the first control 204 while giving a printing instruction to the second control 105' at the same time. This operation is repeated. In this manner, according to the embodiment it is made possible to carry out writing in and reading out of data simultaneously which in turn permits more efficient data transfer and recording continuously without need of waiting time.

The above-mentioned column conversion by the second control part 105 or 105' is carried out in the following manner:

As described above, input of page data to the page memories 104, 204 or 204' is carried out line by line of a page. In other words, one line (row) constitutes one unit of input data. For the purpose of explanation, it is assumed that the maximum number of characters contained in one line is 132 (which number is hereinafter denoted by Imax) and the maximum number of lines contained in one page is 66 (which number is hereinafter denoted by Jmax). These data are to be input to the apparatus. In this case, the page data to be put in the apparatus take such form a shown in FIG. 8. In FIG. 8, each one block BK is allotted to each one character and the numbers given in the blocks BK indicate the sequence in which these characters are to be put in. These input data are stored in the page memories 104, 204 or 204' sequentially, for example, in the order of line starting from the first line as shown in FIG. 9.

For column conversion of these data there is given the following equation:

$$C_n = (66 - V) \cdot 133 + W \quad (1)$$

where,

V: column number after column conversion 1, 2, ... 66

W: row number after column conversion 1, 2, ... 132 and $C_n$: number given in block BK 1, 2, ... 8712.

Thus, the number in BK is to be found in the position of W row and V column after column conversion is $C_n$. Therefore, at first, output is made changing V successively from 1 to 66 while keeping W=1. Next, output is made changing V successively from 1 to 66 while keeping W=2. This output operation is repeated until W=66. Thereby, data can be put out in a fashion as shown in FIG. 10.

Extending the above to a general formula, $$C_n = (J\text{max} - V) \cdot I\text{max} + W \quad (2)$$

Therefore, the necessary column conversion can be attained by putting out data in the following order in accordance with the above formula (2):

| | |
|---|---|
| W = 1 | V = 1, 2, 3, ..., Jmax |
| W = 2 | V = 1, 2, 3, ..., Jmax |
| . | . |
| . | . |
| W = Imax | V = 1, 2, 3, ..., Jmax. |

With this arrangement, the first control 102 or 102' carries out a conversion of input code to internal code, the page memories 104, 204 or 204' carry out storing data and the second control carries out the column conversion. Therefore, a control system with high efficiency or through-put can be obtained.

For example, when it is wished to put Chinese characters or peculiarly figured patterns into the apparatus, use of the conventional code system for data input will put a large quantity of load on the apparatus. More particularly, if such data are put in the apparatus externally using a code system according to JIS C 6228-1975 "Extension method of codes for data exchange", a large load will be required only for interpreting the code. Moreover, a long time is consumed to store such data in the page memory after operation for column conversion. As a result, it generally takes a long time from the start of code input to the issuance of print instruction, which, of course, results in a low through-put as a whole.

According to the above embodiments of the invention, data can be stored in the page memory in the order of code in which the data are put in the apparatus irrespective of whether the recording mode is vertical or horizontal. Therefore, the time required for storing the input data in the page memory can be minimized and the apparatus is able to become prepared for printing immediately after the completion of page storing. Since the column conversion is carried out making use of the time period during which the recording system can have time to spare, the total through-put is substantially increased as compared with the conventional ones. Also, provision of a plural number of page memories according to the invention is contributive to the improvement of the total through-put and efficiency since the written data of the next page have already been received before the end of recording of the previous page.

In case of no column conversion being necessary (recording in vertical mode), the second control 105 or 105' transfers the input data line by line to the column memories 107 and 107' as they were put into the page memories 104 and 204 or 204'. Each of the column memories 107 and 107' stores one line amount of data. A vertical or horizontal mode signal is given to the second control 105 or 105' by MT 100 through the interface 101 and the first control 102 or 102'. Judging whether the signal is of vertical mode or horizontal mode, the second control determines whether column conversion should be done or not.

The second control 105 or 105' used in the above described embodiments is composed of a one chip microcomputer (M 6800 manufactured by Motoroller Co.,) the control operation of which is shown in the following table, Table 1.

In Table 1, the judgment of whether the mode signal is vertical or not is done at the steps 190, 191 and 192 and when the signal is of vertical mode, the necessary control of vertical mode is done at the steps of 75 through 175. When the mode signal is horizontal, the horizontal mode control is done at the steps of 194 through 305 of which steps 231 to 236 are steps at which the above described column conversion is carried out.

TABLE 1

Control Program of the Second Control Part

XXX CPU (program name)

| Program step | ROM address | machine word | | | | assembler language |
|---|---|---|---|---|---|---|
| 00001 | | | | NAM | XXXCPU | |
| 00002 | | 0080 | WADDR | EQU | $80 | |
| 00003 | | 0082 | WDATA | EQU | $82 | |
| 00004 | | 0082 | TRIG | EQU | $82 | |
| 00006 | 0000 | | | ORG | $00 | |
| 00007 | 0000 | 0001 | FORM | RMB | 1 | |
| 00008 | 0001 | 0001 | BEND | RMB | 1 | |
| 00009 | 0002 | 0001 | PEND | RMB | 1 | |
| 00010 | 0003 | 0001 | REND | RMB | 1 | |
| 00011 | 0004 | 0002 | STADDR | RMB | 2 | |
| 00012 | 0006 | 0002 | FADDR | RMB | 2 | |
| 00013 | 0008 | 0002 | SFADDR | RMB | 2 | |
| 00014 | 000A | 0002 | SPADDR | RMB | 2 | |
| 00015 | 000C | 0002 | BFADDR | RMB | 2 | |
| 00016 | 000E | 0001 | LCNTR | RMB | 1 | |
| 00017 | 000F | 0002 | LRADDR | RMB | 2 | |
| 00018 | 0011 | 0001 | FFBYTE | RMB | 1 | |
| 00019 | 0012 | 0001 | SFBYTE | RMB | 1 | |
| 00020 | 0013 | 0001 | FSBYTE | RMB | 1 | |
| 00021 | 0014 | 0001 | SSBYTE | RMB | 1 | |
| 00022 | 0015 | 0001 | FORM1 | RMB | 1 | |
| 00024 | F800 | | | ORG | $F800 | |
| 00025 | F800 | CE 007F | RESET | LDX | ≠$7F | |
| 00026 | F803 | 6F 00 | .RESET | CLR | 0,X | |
| 00027 | F805 | 09 | | DEX | | |
| 00028 | F806 | 26 FB | | BNE | .RESET | |
| 00029 | F808 | 8E 007F | | LDS | ≠$7F | |
| 00030 | F80B | 0E | DLOOP | CLI | | |
| 00031 | F80C | 20 FD | | BRA | DLOOP | |
| 00033 | F80E | 96 01 | LPEND | LDA A | BEND | |
| 00034 | F810 | 27 1B | | BEQ | RPEND | REAL END ? |
| 00036 | F812 | CE 1000 | | LDX | ≠$1000 | |
| 00037 | F815 | 86 04 | | LDA A | ≠$04 | |
| 00038 | F817 | C6 F9 | | LDA B | ≠$F9 | LINE END |
| 00039 | F819 | A7 00 | | STA A | 0,X | |
| 00040 | F81B | 6F 01 | | CLR | 1,X | |
| 00041 | F81D | 6F 02 | | CLR | 2,X | |
| 00042 | F81F | 6F 03 | | CLR | 3,X | |
| 00043 | F821 | A7 04 | | STA A | 4,X | |
| 00044 | F823 | 6F 05 | | CLR | 5,X | |
| 00045 | F825 | E7 06 | | STA B | 6,X | LINE END |
| 00046 | F827 | 6F 07 | | CLR | 7,X | |
| 00047 | F829 | 7F 0001 | | CLR | BEND | |
| 00048 | F82C | 3B | | RTI | | |
| 00050 | F82D | CE 1000 | RPEND | LDX | ≠$1000 | |
| 00051 | F830 | 86 04 | | LDA A | ≠4FA | |
| 00052 | F832 | A7 02 | | STA A | 2,X | PAGE END MARK |
| 00053 | F834 | 97 03 | | STA A | REND | SET REAL END MRK |
| 00054 | F836 | 86 04 | | LDA A | ≠$04 | |
| 00055 | F838 | A7 00 | | STA A | 0,X | |
| 00056 | F83A | 6F 01 | | CLR | 1,X | BLANK |
| 00057 | F83C | 6F 03 | | CLR | 3,X | |

TABLE 1-continued
Control Program of the Second Control Part

XXX CPU (program name)

| Program step | ROM address | machine word | | | | assembler language | |
|---|---|---|---|---|---|---|---|
| 00058 | F83E | 7F 0002 | | CLR | PEND | | |
| 00059 | F841 | 3B | | RTI | | | |
| 00061 | F842 | 4F | LNFORM | CLR A | | | |
| 00062 | F843 | C6 40 | | LDA B | ≠$40 | | |
| 00063 | F845 | D5 11 | | BIT B | FFBYTE | FORM DATA ? | |
| 00064 | F847 | 27 04 | | BEQ | .NFORM | | |
| 00065 | F849 | 97 11 | | STA A | FFBYTE | | |
| 00066 | F84B | 97 12 | | STA A | SFBYTE | CLEAR FORM DATA | |
| 00068 | F84D | D5 13 | .NFORM | BIT B | FSBYTE | | |
| 00069 | F84F | 27 04 | | BEQ | .NSKIP | | |
| 00070 | F851 | 97 13 | | STA A | FSBYTE | | |
| 00071 | F853 | 97 14 | | STA A | SSBYTE | CLEAR FORM DATA | |
| 00072 | F855 | 97 15 | .NSKIP | STA A | FORM1 | | |
| 00073 | F857 | 7E F8B8 | | JMP | LINSKIP | | |
| 00075 | F85A | 84 01 | LONGT | AND A | ≠$01 | | ↓ |
| 00076 | F85C | 97 00 | | STA A | FORM | FORM-ON OR NOT | VERTICAL |
| 00077 | F85E | DE 04 | | LDX | STADDR | | MODE |
| 00078 | F860 | 26 16 | | BNE | LGLOOP | | |
| 00079 | F862 | 96 02 | | LDA A | PEND | | |
| 00080 | F864 | 26 A8 | | BNE | LPEND | | |
| 00082 | F866 | CE 0001 | | LDX | ≠1 | | |
| 00083 | F869 | DF 04 | | STX | STADDR | DATA START ADDR | |
| 00084 | F86B | CE 47C1 | | LDX | ≠18369 | FORM START ADDR | |
| 00085 | F86E | DF 06 | | STX | FADDR | | |
| 00086 | F870 | CE 6BA1 | | LDX | ≠27553 | | |
| 00087 | F873 | DF 0A | | STX | SPADDR | SPACE START ADDR | |
| 00088 | F875 | 7F 0083 | | CLR | $83 | | |
| 00090 | F878 | DE 04 | LGLOOP | LDX | STADDR | | |
| 00091 | F87A | DF 80 | | STX | WADDR | | |
| 00092 | F87C | 08 | | INX | | | |
| 00093 | F87D | 96 80 | | LDA A | WADDR | | |
| 00094 | F87F | 96 82 | | LDA A | WDATA | | |
| 00095 | F881 | DF 80 | | STX | WADDR | | |
| 00096 | F883 | 08 | | INX | | | |
| 00097 | F884 | 97 11 | | STA A | FFBYTE | | |
| 00098 | F886 | 96 82 | | LDA A | WDATA | | |
| 00099 | F888 | 96 82 | | LDA A | WDATA | | |
| 00100 | F88A | DF 80 | | STX | WADDR | | |
| 00101 | F88C | 08 | | INX | | | |
| 00102 | F88D | 97 12 | | STA A | SFBYTE | | |
| 00103 | F88F | 96 82 | | LDA A | WDATA | | |
| 00104 | F891 | 96 82 | | LDA A | WDATA | | |
| 00105 | F893 | DF 80 | | STX | WADDR | | |
| 00106 | F895 | 08 | | INX | | | |
| 00107 | F896 | DF 04 | | STX | STADDR | | |
| 00108 | F898 | 97 13 | | STA A | FSBYTE | | |
| 00109 | F89A | 96 82 | | LDA A | WDATA | | |
| 00110 | F89C | 96 82 | | LDA A | WDATA | | |
| 00111 | F89E | 97 14 | | STA A | SSBYTE | | |
| 00112 | F8A0 | 96 00 | | LDA A | FORM | | |
| 00114 | F8A2 | 27 9E | | BEQ | LNFORM | | |
| 00115 | F8A4 | DE 06 | | LDX | FADDR | | |
| 00116 | F8A6 | DF 80 | | STX | WADDR | | |
| 00117 | F8A8 | 08 | | INX | | | |
| 00118 | F8A9 | 96 82 | | LDA A | WDATA | | |
| 00119 | F8AB | 96 82 | | LDA A | WDATA | | |
| 00120 | F8AD | DF 80 | | STX | WADDR | | |
| 00121 | F8AF | 08 | | INX | | | |
| 00122 | F8B0 | DF 06 | | STX | FADDR | | |
| 00123 | F8B2 | 97 15 | | STA A | FORM1 | | |
| 00124 | F8B4 | 96 82 | | LDA A | WDATA | | |
| 00125 | F8B6 | 96 82 | | LDA A | WDATA | | |
| 00127 | F8B8 | DE 0A | LNSKIP | LDX | SPADDR | | |
| 00128 | F8BA | DF 80 | | STX | WADDR | | |
| 00129 | F8BC | 08 | | INX | | | |
| 00130 | F8BD | DF 0A | | STX | SPADDR | | |
| 00131 | F8BF | D6 82 | | LDA B | WDATA | | |
| 00132 | F8C1 | D6 82 | | LDA B | WDATA | | |
| 00134 | F8C3 | DE 0F | | LDX | LRADDR | | |
| 00135 | F8C5 | E7 03 | | STA B | 3,X | | |
| 00136 | F8C7 | E7 07 | | STA B | 7,X | | |
| 00137 | F8C9 | A7 06 | | STA A | 6,X | | |
| 00138 | F8CB | 96 11 | | LDA A | FFBYTE | | |
| 00139 | F8CD | A7 00 | | STA A | 0,X | | |
| 00140 | F8CF | 96 12 | | LDA A | SFBYTE | | |
| 00141 | F8D1 | A7 01 | | STA A | 1,X | | |
| 00142 | F8D3 | 96 15 | | LDA A | FORM1 | | |

TABLE 1-continued
Control Program of the Second Control Part

XXX CPU (program name)

| Program step | ROM address | machine word | | assembler language | | | |
|---|---|---|---|---|---|---|---|
| 00143 | F8D5 | A7 02 | | STA A | 2,X | | |
| 00145 | F8D7 | 96 13 | | LDA A | FSBYTE | | |
| 00146 | F8D9 | A7 04 | | STA A | 4,X | | |
| 00147 | F8DB | 96 14 | | LDA A | SSBYTE | | |
| 00148 | F8DD | A7 05 | | STA A | 5,X | | |
| 00149 | F8DF | 96 10 | | LDA A | LRADDR+1 | | |
| 00150 | F8E1 | 8B 08 | | ADD A | ≠8 | | |
| 00151 | F8E3 | 97 10 | | STA A | LRADDR+1 | | |
| 00152 | F8E5 | 96 0F | | LDA A | LRADDR | | |
| 00153 | F8E7 | 89 00 | | ADC A | ≠0 | | |
| 00154 | F8E9 | 97 0F | | STA A | LRADDR | | |
| 00155 | F8EB | 7A 000E | | DEC | LCNTR | | |
| 00156 | F8EE | 26 88 | | BNE | LGLOOP | | |
| 00158 | F8F0 | DE 0F | | LDX | LRADDR | | |
| 00159 | F8F2 | 86 F9 | | LDA A | ≠$F9 | | |
| 00160 | F8F4 | A7 02 | | STA A | 2,X | | |
| 00161 | F8F6 | 86 04 | | LDA A | ≠$04 | | |
| 00162 | F8F8 | A7 00 | | STA A | 0,X | | |
| 00163 | F8FA | 6F 01 | | CLR | 1,X | | |
| 00164 | F8FC | 6F 03 | | CLR | 3,X | | |
| 00166 | F8FE | DE 04 | | LDX | SRADDR | | |
| 00167 | F900 | 8C 47C1 | | CPX | ≠18369 | | |
| 00168 | F903 | 26 0B | | BNE | RETURN | | |
| 00170 | F905 | CE 0000 | | LDX | ≠0 | | |
| 00171 | F908 | DF 04 | | STX | STADDR | | |
| 00172 | F90A | 86 FF | | LDA A | ≠$FF | | |
| 00173 | F90C | 97 02 | | STA A | PEND | | |
| 00174 | F90E | 97 01 | | STA A | BEND | | ↑ |
| 00175 | F910 | 3B | RETURN | RTI | | | |
| 00177 | F911 | 7E F85A | ,LONGT | JMP | LONGT | | |
| 00179 | F914 | 96 03 | IRQ | LDA A | REND | | |
| 00180 | F916 | 27 05 | | BEQ | MIRQ | | |
| 00181 | F918 | 7F 0003 | | CLR | REND | | |
| 00182 | F91B | 20 F3 | | BRA | RETURN | | |
| 00183 | F91D | CE 0000 | MIRQ | LDX | ≠0 | | |
| 00184 | F920 | DF 80 | | STX | WADDR | | |
| 00185 | F922 | CE 1000 | | LDX | ≠$1000 | | |
| 00186 | F925 | DF 0F | | STX | LRADDR | | |
| 00187 | F927 | 86 38 | | LDA A | ≠56 | | |
| 00188 | F929 | 97 0E | | STA A | LCNTR | | |
| 00189 | F92B | 96 82 | | LDA A | WDATA | | |
| 00190 | F92D | 96 82 | | LDA A | WDATA | ⎫ judging of whether mode | | |
| 00191 | F92F | 85 02 | | BIT A | ≠$02 | ⎬ of vertical or of | | |
| 00192 | F931 | 27 DE | | BEQ | .LONGT | ⎭ horizontal | | ↓ |
| 00194 | F933 | 84 01 | | AND A | ≠$01 | | |
| 00195 | F935 | 97 00 | | STA A | FORM | FORM-ON OR NOT | horizontal mode |
| 00197 | F937 | DE 04 | | LDX | STADDR | | |
| 00198 | F939 | 26 12 | | BNE | TRCONT | UNDER WAY ? | |
| 00200 | F93B | 96 02 | | LDA A | PEND | | |
| 00201 | F93D | 26 7A | | BNE | TEND | PAGE END | |
| 00203 | F93F | 86 80 | | LDA A | ≠$80 | | |
| 00204 | F941 | 97 83 | | STA A | $83 | SET T-L | |
| 00205 | F943 | CE 6BA4 | | LDX | ≠27556 | | |
| 00206 | F946 | DF 08 | | STX | SFADDR | | |
| 00207 | F948 | CE 46E7 | | LDX | ≠18151 | | |
| 00208 | F94B | DF 04 | | STX | STADDR | | |
| 00209 | F94D | DF 0C | TRCONT | STX | BFADDR | | |
| 00210 | F94F | DE 08 | | LDX | SFADDR | | |
| 00211 | F951 | DF 06 | | STX | FADDR | | |
| 00213 | F953 | DE 0C | TRLOOP | LDX | BFADDR | | |
| 00214 | F955 | DF 80 | | STX | WADDR | WADDR=BFADDR | |
| 00215 | F957 | 08 | | INX | | | |
| 00216 | F958 | 96 82 | | LDA A | WDATA | | |
| 00217 | F95A | 96 82 | | LDA A | WDATA | | |
| 00218 | F95C | DF 80 | | STX | WADDR | | |
| 00219 | F95E | D6 00 | | LDA B | FORM | | |
| 00220 | F960 | 27 76 | | BEQ | TNFORM | | |
| 00222 | F962 | DE 0F | | LDX | LRADDR | | |
| 00223 | F964 | A7 00 | | STA A | 0,X | | |
| 00224 | F966 | 96 82 | | LDA A | WDATA | | |
| 00225 | F968 | 96 82 | | LDA A | WDATA | | |
| 00226 | F96A | A7 01 | | STA A | 1,X | | |
| 00228 | F96C | DE 06 | | LDX | FADDR | | |
| 00229 | F96E | DF 80 | | STX | WADDR | | |
| 00230 | F970 | DE 0F | | LDX | LRADDR | | |
| 00231 | F972 | 96 82 | | LDA A | WDATA | | |

TABLE 1-continued

Control Program of the Second Control Part

XXX CPU (program name)

| Program step | ROM address | machine word | | assembler language | |
|---|---|---|---|---|---|
| 00232 | F974 | 96 82 | | LDA A | WDATA |
| 00233 | F976 | A7 02 | | STA A | 2,X |
| 00234 | F978 | 96 07 | | LDA A | FADDR+1 |
| 00235 | F97A | 80 84 | | SUB A | ≠132 |
| 00236 | F97C | 97 07 | | STA A | FADDR+1 |
| 00237 | F97E | 24 03 | | BCC | TSKIP |
| 00238 | F980 | 7A 0006 | | DEC | FADDR |
| 00239 | F983 | 96 10 | TSKIP | LDA A | LRADDR+1 |
| 00240 | F985 | 8B 04 | | ADD A | ≠4 |
| 00241 | F987 | 97 10 | | STA A | LRADDR+1 |
| 00242 | F989 | 96 0C | | LDA A | BFADDR |
| 00243 | F98B | D6 0D | | LDA B | BFADDR+1 |
| 00244 | F98D | C0 4A | | SUB B | ≠74 |
| 00245 | F98F | 82 01 | | SBC A | ≠$01 |
| 00246 | F991 | 97 0C | | STA A | BFADDR |
| 00247 | F993 | D7 0D | | STA B | BFADDR+1 |
| 00248 | F995 | 7A 000E | | DEC | LCNTR |
| 00249 | F998 | 26 B9 | | BNE | TRLOOP |
| 00250 | F99A | DE 0F | | LDX | LRADDR |
| 00252 | F99C | 86 F9 | | LDA A | ≠$F9 |
| 00253 | F99C | A7 02 | | STA A | 2,X |
| 00254 | F9A0 | 86 04 | | LDA A | ≠$04 |
| 00255 | F9A2 | A7 00 | | STA A | 0,X |
| 00256 | F9A4 | 6F 01 | | CLR | 1,X |
| 00257 | F9A6 | 6F 03 | | CLR | 3,X |
| 00258 | F9A8 | DE 08 | | LDX | SFADDR |
| 00259 | F9AA | 08 | | INX | |
| 00260 | F9AB | DF 08 | | STX | SFADDR |
| 00261 | F9AD | DE 04 | | LDX | STADDR |
| 00262 | F9AF | 08 | | INX | |
| 00263 | F9B0 | 08 | | INX | |
| 00264 | F9B1 | DF 04 | | STX | STADDR |
| 00265 | F9B3 | 8C 4831 | | CPX | ≠18481 |
| 00266 | F9B6 | 27 16 | | BEQ | TPEND |
| 00267 | F9B8 | 3B | | RTI | |
| 00268 | F9B9 | CE 1000 | TEND | LDX | ≠$1000 |
| 00270 | F9BC | 86 FA | | LDA A | ≠$FA |
| 00271 | F9BE | A7 02 | | STA A | 2,X |
| 00272 | F9C0 | 97 03 | | STA A | REND |
| 00273 | F9C2 | 86 04 | | LDA A | ≠$04 |
| 00274 | F9C4 | A7 00 | | STA A | 0,X |
| 00275 | F9C6 | 6F 01 | | CLR | 1,X |
| 00276 | F9C8 | 6F 03 | | CLR | 3,X |
| 00277 | F9CA | 7F 0002 | | CLR | PEND |
| 00278 | F9CD | 3B | | RTI | |
| 00279 | F9CE | CE 0000 | TPEND | LDX | ≠0 |
| 00281 | F9D1 | DF 04 | | STX | STADDR |
| 00282 | F9D3 | 86 FF | | LDA A | ≠$FF |
| 00283 | F9D5 | 97 02 | | STA A | PEND |
| 00284 | F9D7 | 3B | | RTI | |
| 00287 | F9D8 | DE 0F | TNFORM | LDX | LRADDR |
| 00288 | F9DA | 85 40 | | BIT A | ≠$40 |
| 00289 | F9DC | 27 0C | | BEQ | RDATA |
| 00290 | F9DE | 4F | | CLR A | |
| 00291 | F9DF | A7 00 | | STA A | 0,X |
| 00292 | F9E1 | A7 01 | | STA A | 1,X |
| 00293 | F9E3 | A7 02 | | STA A | 2,X |
| 00294 | F9E5 | A7 03 | | STA A | 3,X |
| 00295 | F9E7 | 7E F983 | | JMP | TSKIP |
| 00297 | F9EA | A7 00 | RDATA | STA A | 0,X |
| 00298 | F9EC | 96 82 | | LDA A | WDATA |
| 00299 | F9EE | 96 82 | | LDA A | WDATA |
| 00300 | F9F0 | A7 01 | | STA A | 1,X |
| 00301 | F9F2 | 4F | | CLR A | |
| 00302 | F9F3 | A7 02 | | STA A | 2,X |
| 00303 | F9F5 | A7 03 | | STA A | 3,X |
| 00304 | F9F7 | 7E F983 | | JMP | TSKIP |
| 00305 | | 0000 | | END | |

TOTAL ERRORS 00000

Note: "columm conversion is under going" annotation applies to steps 00232–00236.

Figure 11:
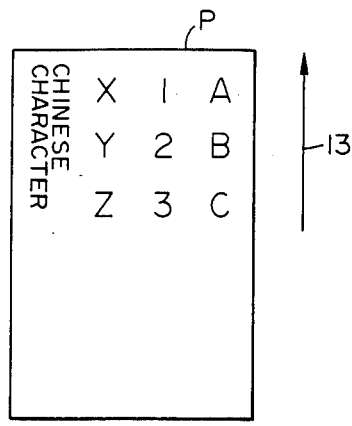
FIG. 11 illustrates recording without rotation of character dot pattern.

In the manner mentioned above, the direction of line-up of written data relative to the direction of the recording medium or secondary scanning can be converted as shown in FIG. 6. However, if the direction of secondary scanning 13 is constant, then a conversion of dot pattern arrangement for characters is necessary. Without conversion of arrangement of the dot pattern, there will be obtained an arrangement of characters as shown in FIG. 11. The form of arrangement shown in FIG. 11 is practically difficult to use as a document written in a European language such as English and French although it is useful as a document written in Chinese or Japanese. To eliminate this disadvantage it is required to rotate the dot pattern arrangement of characters obtainable from the character generator by 90°. The character generator 109 shown in FIGS. 4 and 7 performs this function for rotational displacement of the dot pattern.

Now, the manner of how the dot pattern is rotated will be described in detail with reference to the related drawings.

Figure 13:
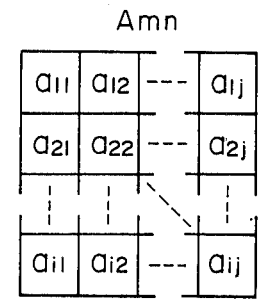
FIGS. 12 and 13 illustrate the manner of division of a dot pattern.
Figure 12:
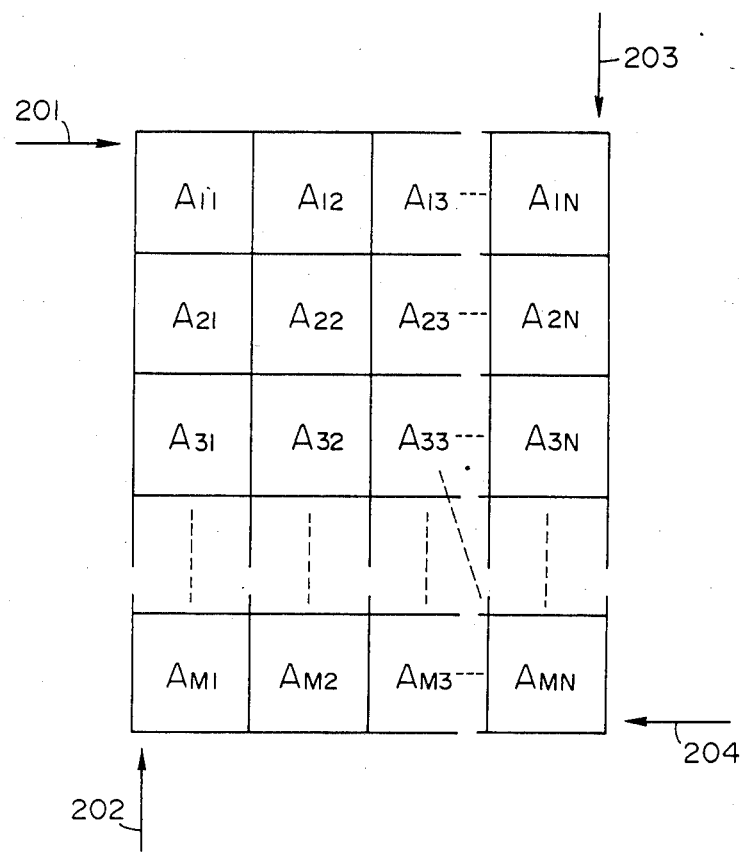

FIG. 12 illustrates an example of a dot pattern dividing method according to the invention. According to the method, a dot pattern for one character is divided into a group of unit matrixes Amn in M rows and n columns and further each unit matrix Amn is subdivided into elements aij, each element corresponding to each dot as shown in FIG. 13. Arranging the elements aij of unit matrix Amn in the order shown in FIG. 13, a one word (i·j) bit memory stores the elements. For example, when $i=j=4$, they may be stored in a one word 16 bit memory or in two one word 8 bit memories provided that the two memories are accessible at the same time. Similarly, when one word 4 bit memory is used, four sets of such memories are necessary and when one word 1 bit memory is used, 16 sets of such memories must be provided. In this case it is essential that all (i·j) bits be accessible at the same time.

By providing such memories in a number sufficient enough to cover (M·N) words, all of dots of the dot pattern can be stored.

Figure 14:
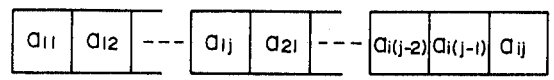
FIG. 14 shows a row of data.

To generate a pattern using such dot pattern divided memories, access to the memories is made in the order of $A_{11}, A_{12}, A_{13}, \ldots A_{MN}$ and the data put out therefrom, that is, aij are used as video signals for the pattern generator in the sequence of $a_{11}, a_{12}, a_{13}, a_{1j}, a_{21}, \ldots a_{i(j-1)}, a_{ij}$ as shown in FIG. 14. Thus, an ordinary pattern can be obtained.

Also, a pattern rotated clockwise by 90° can be obtained when the sequence of access to the memories is changed over to that of $A_{M1}, A_{(M-1)1}, \ldots, A_{11}, A_{M2}, A_{(M-1)2}, \ldots, A_{MN}, A_{1N}$ and the output data aij are used as video signals to the pattern generator in the sequence of $ai_1, a(i-1)_1, \ldots a_{21}, a_{11}, a_{i2}, \ldots, a_{2j}, a_{1j}$.

Similarly, a pattern rotated by 180° can be obtained by making access to the memories in the sequence of $A_{MN}, A_{M(N-1)}, \ldots A_{M2}, A_{M1}, \ldots A_{(M-1)2}, A_{(M-1)1} \ldots A_{1N}, A_{1(N-1)}, \ldots A_{11}$, and forming video signals using the output data aij in the sequence of aij, ai(j−1), ... ai2, ai1.

In this manner, rotation of pattern can be done very easily only by changing the access sequence to unit matrixes Amn and the sequence of readout of data aij.

To maintain the operation speed of such pattern rotation constant it is preferable to use a square matrix for elements of unit matrix Amn. Namely, the preferred number of elements is $i=j$ which serves also for simplification of circuits. Considering further the recent development of elements relating to computers, it is preferrable that $i=j=2l$ ($l=1, 2, \ldots$). But, the present invention is never limited thereto. Speed-up of pattern generation can be attained in a simple manner by employing a larger number for i and j.

As for M·N which determines the size of the group of matrixes, there is no need of limiting it. But, a simplification of circuits can be attained by using $MN=2L$ ($L-1, 2, 3\ldots$).

Figure 15:
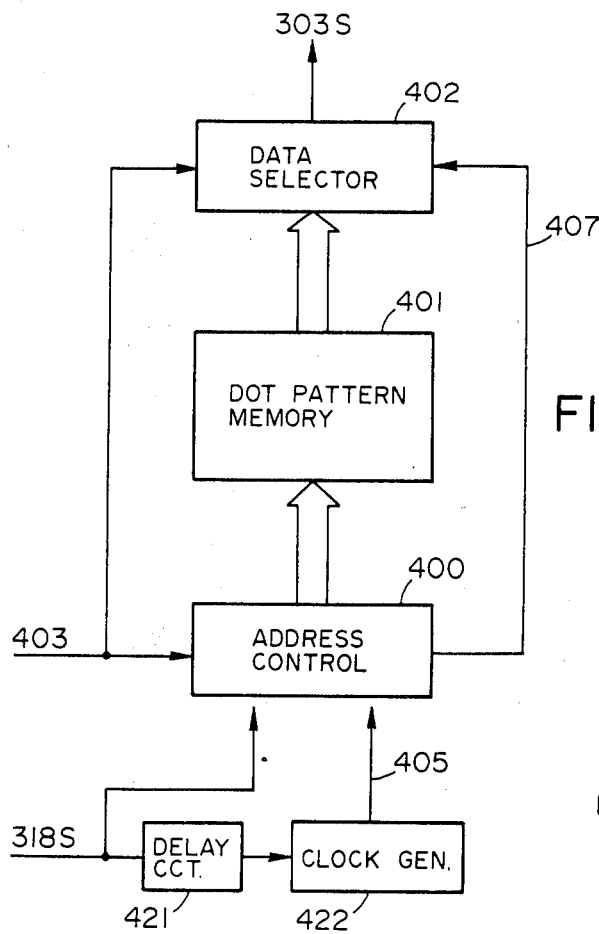
FIG. 15 is a block diagram of a control system.

FIG. 15 is a block diagram of a pattern generator with memories arranged in accordance with the invention.

In FIG. 15, the reference numeral 400 designates an address control circuit and 402 is a data selector for selectively putting out the output data from a dot pattern memory 401. Video signals to the photo-modulator 303 are supplied from the data selector 402. Signal 403 (vertical/horizontal mode signal) determines the rotation angle of the image of output pattern. When the mode signal is introduced into the address control 400, the latter determines the address sequence to the memory so that data are put out from the memory in the sequence described above. By means of horizontal synchronizing signal 318S and vertical synchronizing signal 405 the address then required is determined. Thus, the content of the memory 401 corresponding to the determined address is put out to the data selector 402. The horizontal synchronizing signal 318S is a signal obtained from the beam detector 318(FIG. 3) every scan and corresponds to a row clock as described later. The vertical synchronizing signal 405 is a clock signal obtained a certain determined time after the beam detection by the beam detector 318. This signal corresponds to a column clock as described later. To produce the column clock there are provided a delay circuit 421 and a clock generator 422.

Simultaneously with output of data from the memory 401 to the data selector 402, clock 407 is put out from the address control 400 into the data selector 402. The data selector produces video signal 303S while selecting the necessary signals from the data given by the memory 401 by means of the clock and image rotation control signal 403.

To illustrate the present invention more concretely, an example is given below.

In this example, $i=4$, $j=4$, $M=4$ and $N=8$, and two different kinds of memories are used to form a group of unit matrixes.

Figure 16:
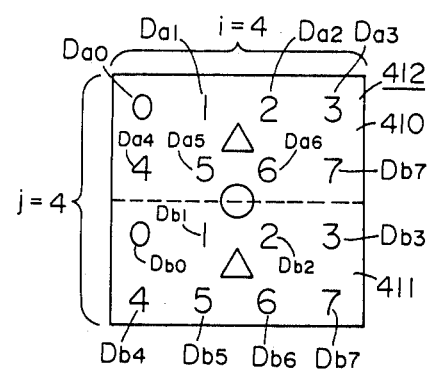
FIG. 16 shows a memory of unit matrix.
Figure 19A:
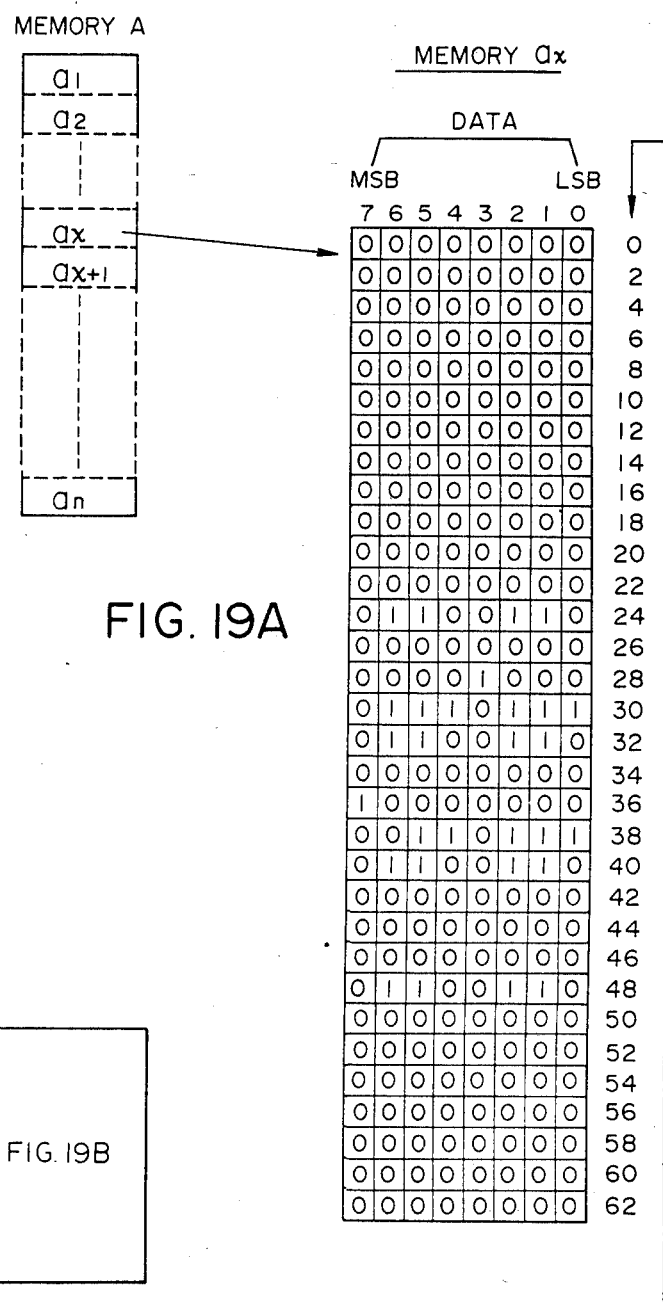
FIGS. 19A and 19B are related.
Figure 19:
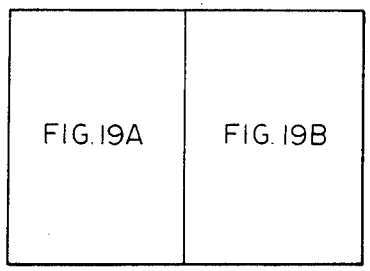
FIG. 19 shows how
Figure 19B:
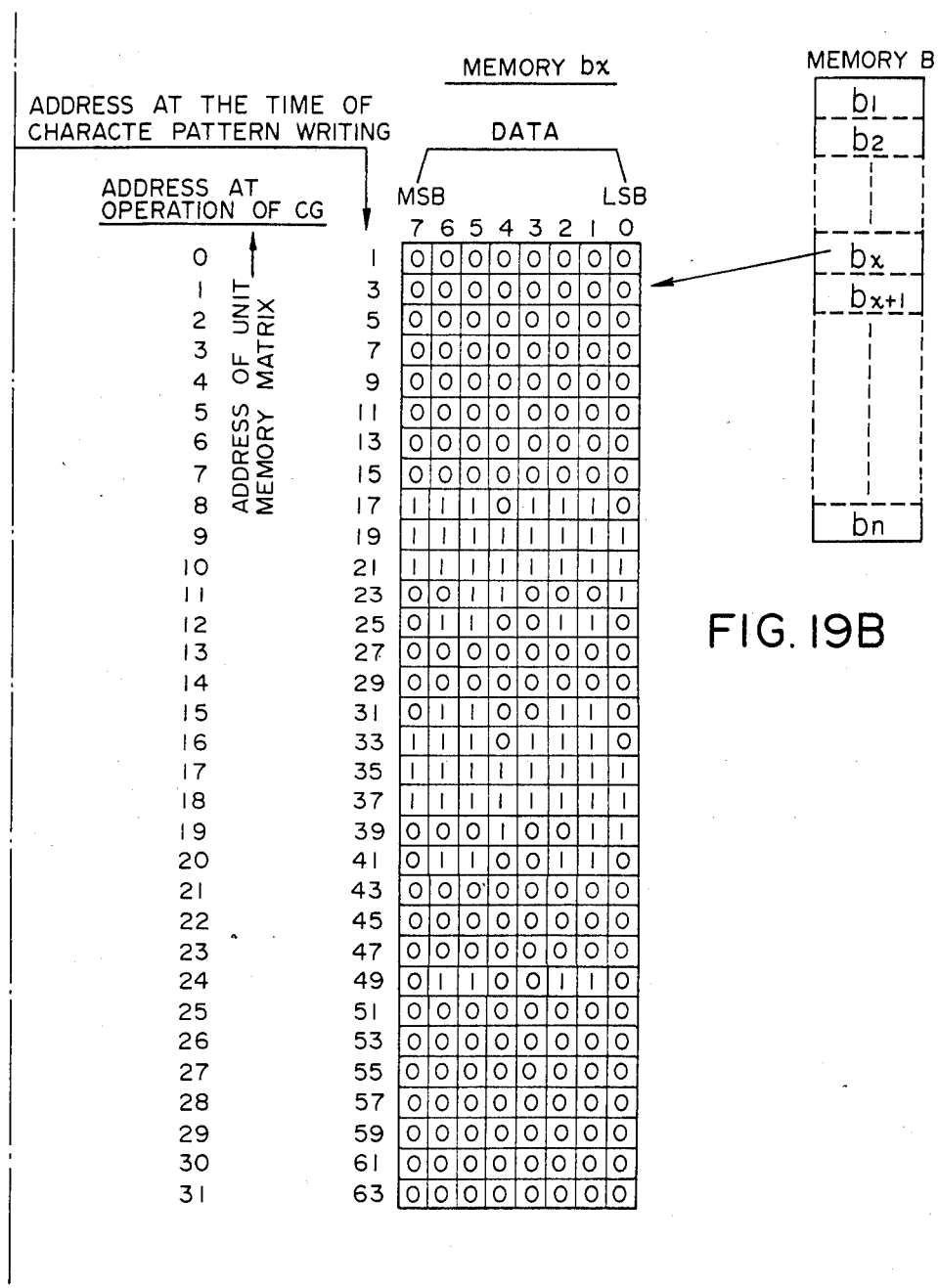

FIG. 16 shows a unit matrix memory corresponding to Amn in FIG. 13, FIG. 19A and FIG. 19B shows a concrete example of memory matrix group formed under the above given conditions.

As seen best in FIG. 16, each unit matrix 412 in the matrix group is composed of two different memories, that is, one 8 bit memory A and one 8 bit memory B. The memory A is designated by 410 and the memory B by 411. The number given in Δ of the memory is the data address at the time of writing and that in O is the data address at the time of reading out. FIG. 18 illustrates the manner of operation of the memory matrix group when a character "P" is considered as an example.

In the illustrated embodiment, each memory A, B is formed using a 1 cell (1 word) 8 bit type of memory which may be a ROM or a RAM. In case of a RAM, character entry is made possible by a controller MPU or the like connected with CG. As shown in FIGS. 19A and 19B, the memory A is composed of a number of memories $a_l - a_n$ for every character unit and the memory B is composed of a number of memories $b_l - b_n$ for every character unit. One of the character units $a_l - a_n$, that is, memory $a_x$ is also shown in FIG. 19A in an enlarged form to show the structure in detail. Also, memory $b_x$ is shown in an enlarged form in FIG. 19B for the same purpose.

The memories $a_x$ and $b_x$ correspond to the memory matrix group (dot pattern) shown in FIG. 18 and in case of the character "P" shown in FIG. 18, the data of memories a and b are recorded as shown in FIG. 19.

While as the memories A and B, 1 cell (1 word) 8 bit memories have been described, the capacity of the memory may be determined suitably taking into consideration the value of (i·j) of unit matrix which is in turn determined by various factors such as speed of character generation, memory speed, the capacity of a data writing for the case of RAM (for example, when writing is done with CPU, the capacity of the CPU for parallel processing data) and other conditions relating to hardware. In the shown embodiment, since the parallel data processing capacity of CPU was considered to be 8 bit, the memories A and B were shown to be of 8 bit. For either of memories A and B, the same effect as described above may be obtained by using eight 1 cell (1 word) 1 bit memories, four 2 bit memories or two 4 bit memories as one unit.

Now, the relation between scanning and the above described memories will be described with reference to FIGS. 20 and 21.

Figure 20:
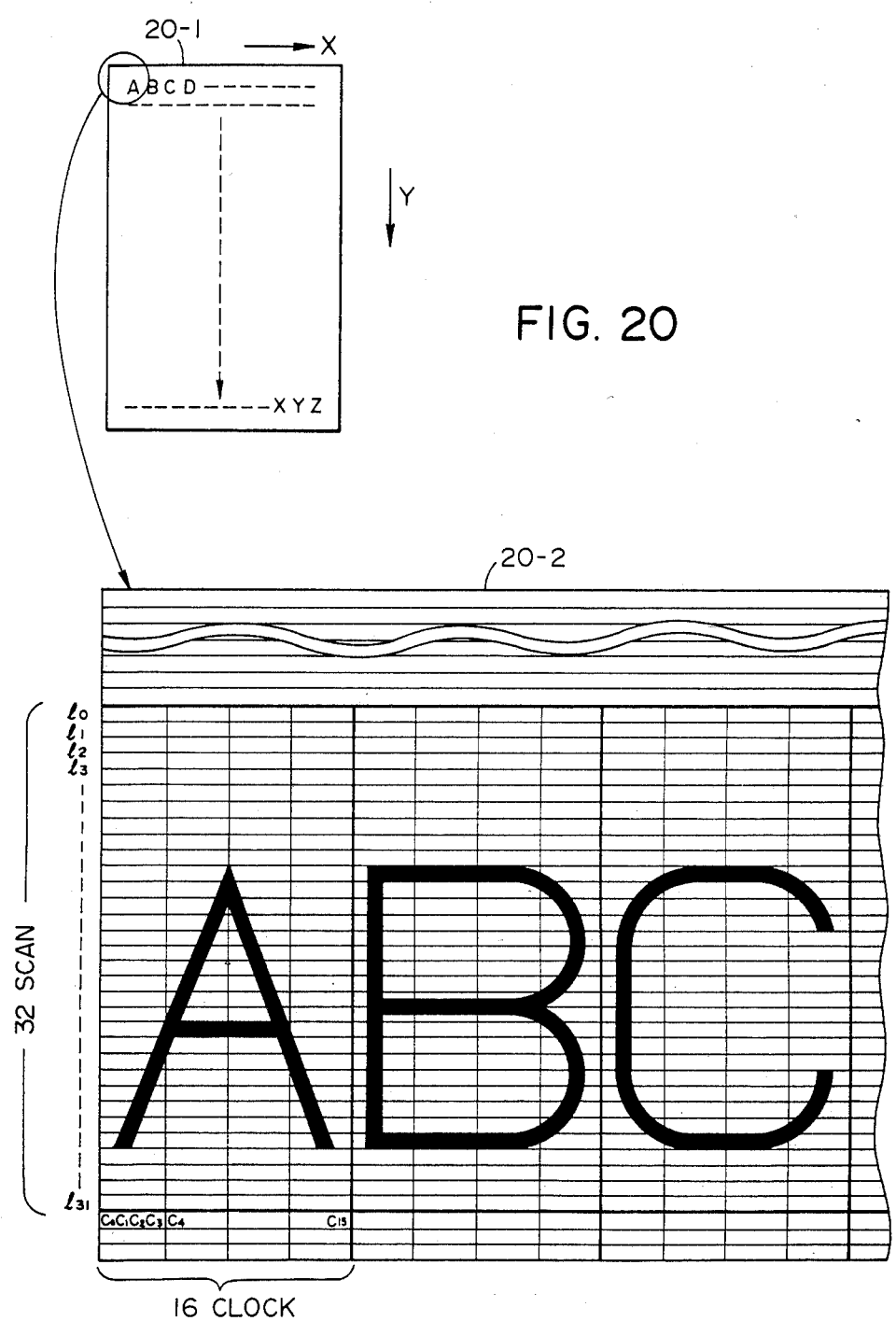
FIGS. 20 and 21 show examples of an output form of characters.
Figure 21:
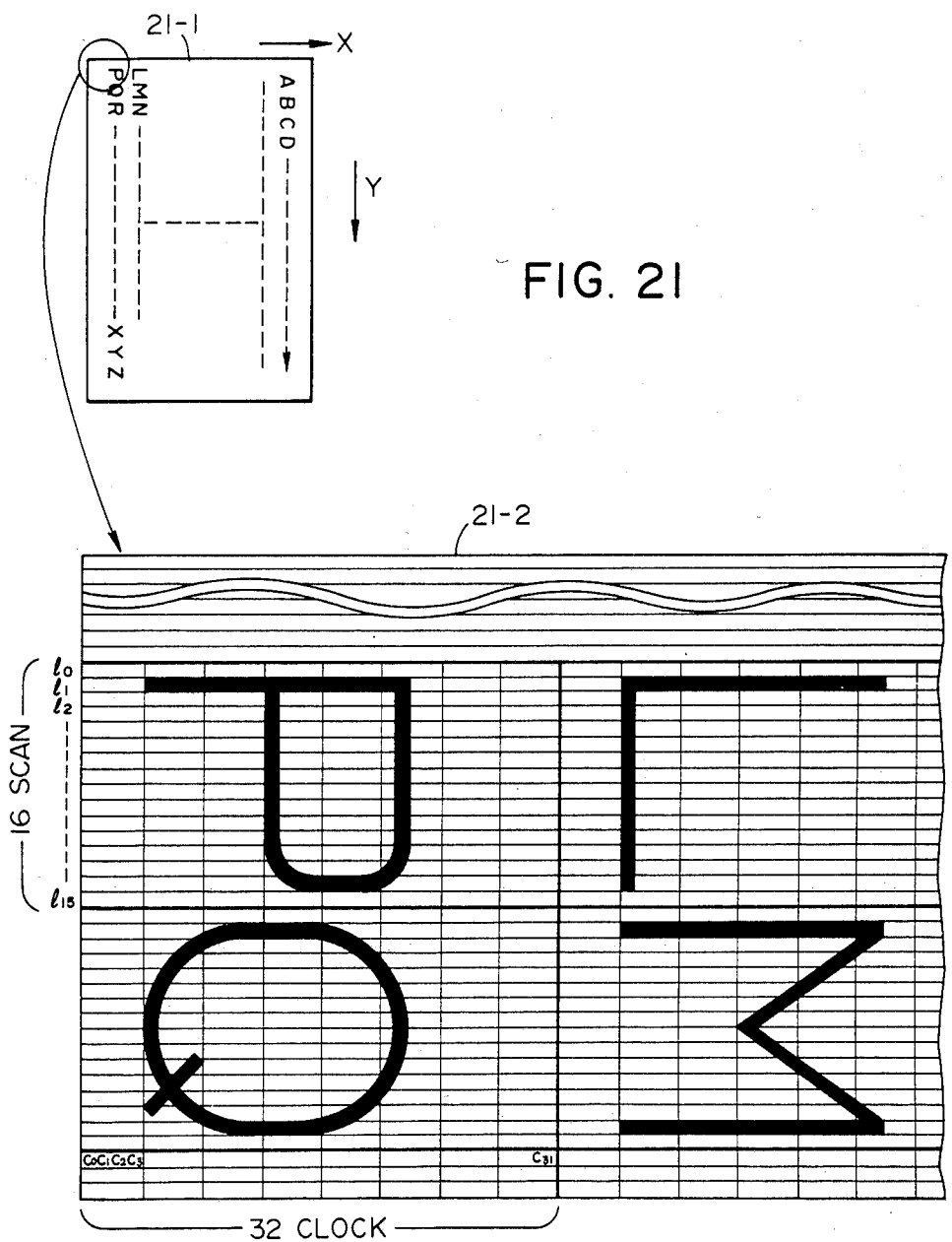

In FIGS. 20 and 21 showing an example of character output, the arrow X indicates the direction of primary scan at the time of output and Y indicates the direction of secondary scan.

FIG. 20-1 shows the display surface at the time of vertical mode output and 20-2 is a partial enlarged view thereof, and FIG. 21-1 shows the display surface at the time of horizontal mode output and 21-2 is a partial enlarged view thereof.

In FIGS. 20-2 and 21-2, $l_0, l_1, l_2, l_3, \ldots$ are scan line numbers in Y direction, which correspond to $l_0, l_1, l_2, l_3, \ldots$ of dot pattern shown in FIG. 18, and $C_0, C_1, C_2, C_3 \ldots$ are clock numbers in X direction, which correspond to $C_0, C_1, C_2, C_3 \ldots$ of the dot pattern respectively.

In this example, considering only one single character as an example, access to the addresses of unit memory matrix (numbers given in ○ in FIG. 17) is made in the sequence of 0, 1, 2, 3, 4, 5, 6, ... 31 for the vertical mode and in the sequence of 28, 24, 20, ..., 0, 29, 25, ..., 1, 30, ... 2, 31, ... 3 for the horizontal mode.

Figure 22:
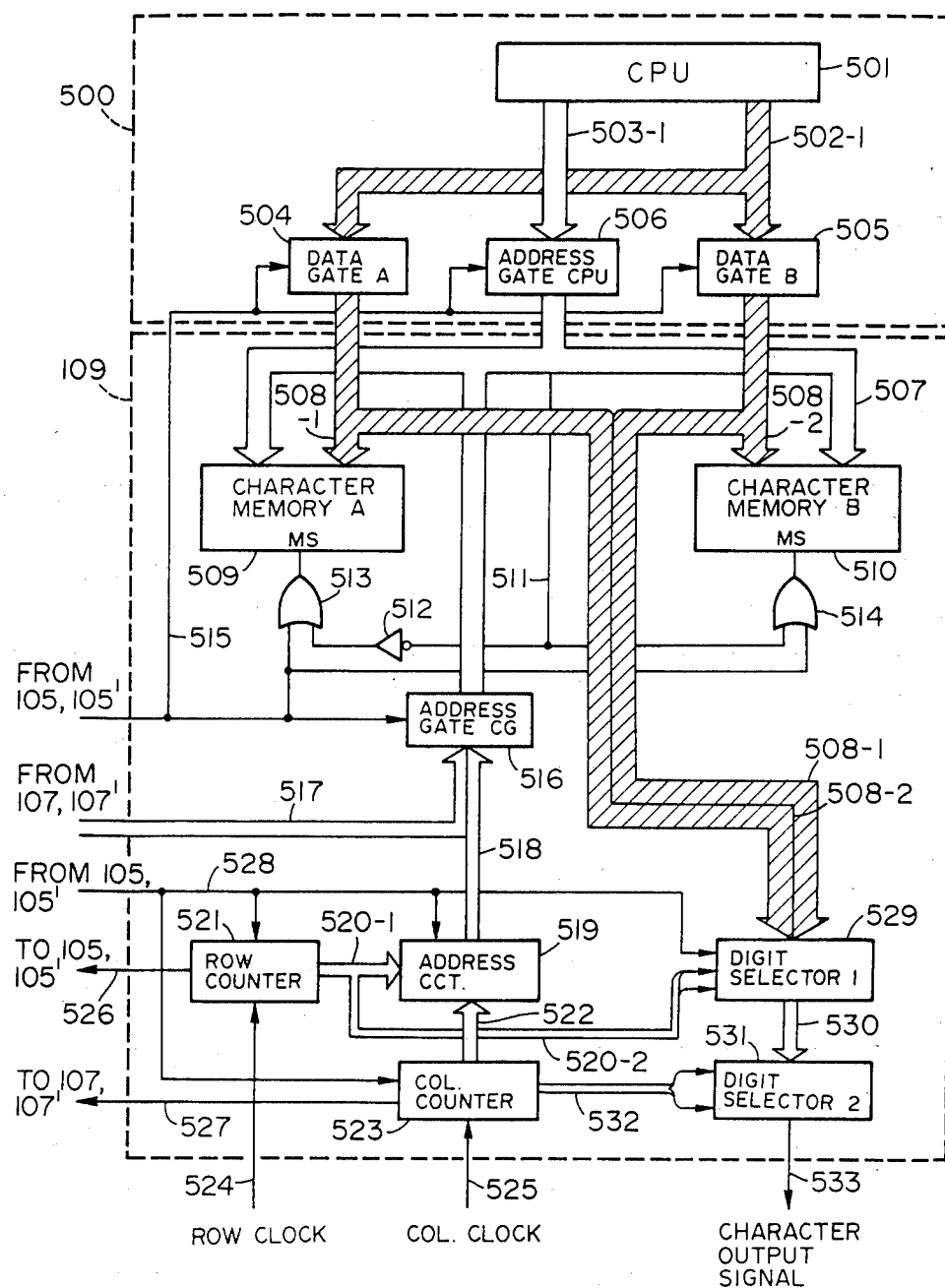
FIG. 22 is a block diagram of a control circuit in the character generator.

Data selection (as in FIG. 16, data within the cells of memory A 110 are denoted by $Da_0, Da_1 \ldots Da_7$ and data within the cells of memory B 111 by $Db_0, Db_1 \ldots Db_7$) is made in the following sequence:
For the vertical mode;

$Da_0, Da_1, Da_2, Da_3, \ldots Da_4, Da_5, Da_6, Da_7, \ldots,$
$Db_0,$ $Db_1, Db_2, Db_3, \ldots, Db_4, Db_5, Db_6, Db_7, \ldots$ For the horizontal mode;

$Db_4, Db_0, Da_4, Da_0, \ldots, Db_5, Db_1, Da_5, Da_1, \ldots,$ $Db_6, Db_2, Da_6, Da_2, \ldots, Db_7, Db_3, Da_7, Da_3 \ldots$ FIG. 22 is a more detailed control block diagram of the above described character generator 109. In this embodiment, a RAM is used as dot pattern memory to enable an entry of character dot pattern data by CPU and the like.

500 is a control circuit for the entry of data mentioned above. 501 is a CPU for making entry of character data in RAM. The CPU has also relation with other mass memory (MT, DISC etc. not shown) so as to take out character data from the mass memory and register the data in dot pattern memories A and B designated by reference numerals 509 and 510 respectively. Data line 502-1 extends from CPU to dot pattern memories A 509 and B 510 through data gates A 504 and B 505 and output lines 508-1 and -2 thereof respectively.

For access to dot pattern memories from the CPU, an address bus 503-1 extends to the memories A and B through address gate 506 and bus 507. Line 511 is an address line which uses a particular bit as memory select line (referred to also as MS line) for dividing the dot pattern memory (referred to also as character memory) into A 509 and B 510. In case of the example shown in FIG. 17, the particular line is the least significant bit (LSB) of the address line. When it is "0", character memory A is selected and when "1" the other character memory B is selected. Designated by 512 is an inverter which makes "0" and "1" of the address line 511 inverted. 513 and 514 are OR circuits which make it possible to make access to both of memories A and B (509 and 510) at the same time at operation of character generation (which is referred to also simply as CG) although memory selection (MS) is done relying upon the address line as mentioned above.

Line 515 is a control line for supplying a CG operation signal. The CG operation signal is applied to data gates A 504 and B 505 as well as address gate 506 to inhibit a connection between the memory for entry of dot pattern data by CPU 501 and the character memory. On the other hand, the CG operation signal is applied to the character memories A and B to bring them in "enable" position at the same time.

Also, the CG operation signal is applied to the address gate 516 which in response to the signal, connects the character selection signal line 517 and unit matrix selection signal line 518 to the character memories A and B.

Designated by 519 is a memory address determination circuit which produces unit memory matrixes in the sequence described above, 521 is a row counter for counting through line 520-1 row counts, that is, $l_0, l_1, l_2, l_3, \ldots l_{15}$ in FIGS. 18, 20 and 21. This row counter 521 is of 5 bit and repeats counting of 0 to 31. 523 is a column counter for counting clocks $C_0, C_1, C_2, C_3 \ldots$ in FIGS. 20 and 21 through line 522. Like the row counter, this column counter is of 5 bits and repeats counting of 0 to 31. The row counter 521 receives row clock, that is, X-direction scan line synchronizing signal (318S in FIGS. 7 and 4) through line 524 to perform its counting operation. Similarly, the column counter 523 receives column clock, that is, signal synchronized with picture element frequency through line 525.

Since the character dot pattern used in the embodiment is of 16 (horizontal)×32 (vertical), the row counter 521 issues a row end signal at every count-up time of 32 counts for the vertical mode and at every count-up time of 16 counts for the horizontal mode. The row end signal is applied to the second control 105, 105' (FIGS. 4 and 7) through line 526 to change over the data selectors 106 and 108. Similarly, the column counter 523 issues a column end signal at every count-up time of 16 counts for the vertical mode and at every count-up time of 32 counts for the horizontal mode. The column end signal is applied to the column memory 107 or 107' through line 527 to effect changeover of character. The column memory changes the memory address for character selection through address bus 517 every time when it receives the row end signal and column end signal.

The row counter 521, column counter 523 and address determination circuit 519 receive a vertical/horizontal mode signal through line 528 to perform their various operations as described above.

At the time of CG operation, data output buses of the character memories A and B become 508-1 (8 bit parallel) and 508-2 (8 bit parallel) which are applied to digit selector (1) 529 and further to digit selector (2) 531 through bus 530.

At the digit selector (1) 529, the following data are sequentially selected among data within the unit matrix memory shown in FIG. 16, in a form of 4 bit per group: For the vertical mode;

($Da_0$, $Da_1$, $Da_2$, $Da_3$), ($Da_4$, $Da_5$, $Da_6$, $Da_7$), ($Db_0$, $Db_1$, $Db_2$, $Db_3$), ($Db_4$, $Db_5$, $Db_6$, $Db_7$).

For the horizontal mode;

($Db_4$, $Db_0$, $Da_4$, $Da_0$), ($Db_5$, $Db_1$, $Da_5$, $Da_1$), ($Db_6$, $Db_2$, $Da_6$, $Da_2$), ($Db_7$, $Db_3$, $Da_7$, $Da_3$).

This selection is made by means of a lower 2 bit signal of row counter coming through bus 520-2 among output data of 16 bit from the memories A and B.

The digit selector (2) 531 receives a lower 2 bit signal of column counter through line 532 and selects data in such manner that the 4 bit signals selected by the digit selector (1) may be put out sequentially from the selector (2). These selected signals from through the output line 533 such 1 bit signals in synchronism with column clock which are useful for the recording apparatus 300 as video signals. The signal thus obtained is useful also for other various applications such as display on the surface of CRT, printing employing other recording systems including laser beam and ink jet and image transmission by facsimile etc.

While in the embodiment of the invention a dot pattern is obtained as a time series signal, it is also possible to drive, at the same time, many printing heads of a recording apparatus provided with full-multi-stylus heads or full-multi-ink jet heads arranged in one row in the primary scanning direction when an in-series input-parallel output type of shift register is provided.

Figure 23:
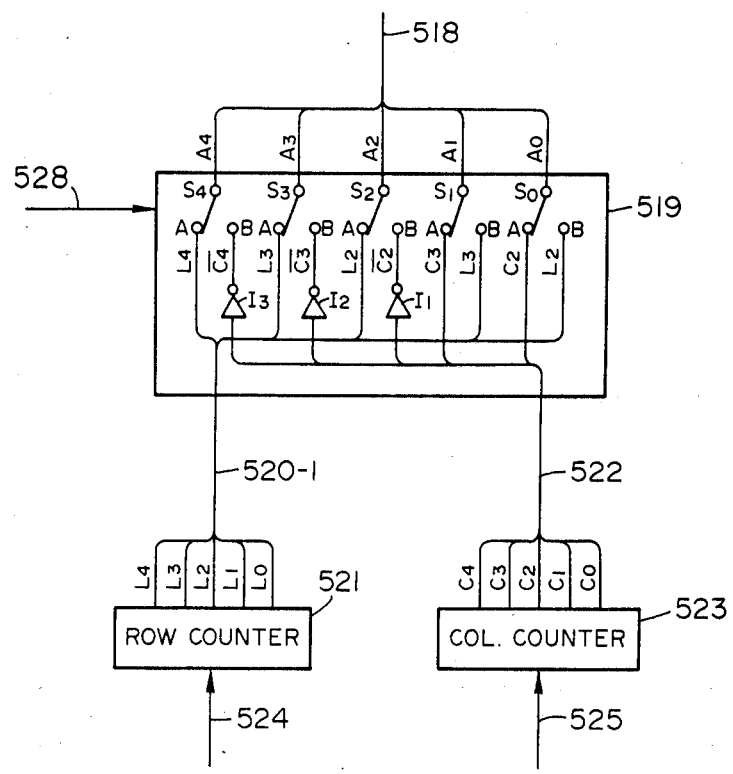
FIG. 23 shows an address determination circuit and its peripheral circuit.

In the above, one embodiment to illustrate a character dot pattern rotation has been described. Now, the function of address determination will be described in detail with reference to FIG. 23.

The row counter 521 used in the embodiment is a 5 bit binary counter which operates while receiving a scan line synchronizing signal. The counter 521 repeats counting of 32 counts in a fashion of 0. 1. 2. 3 ... 31. 0. 1. 2. 3 ... 31. The 5 bit output lines thereof are denoted by $L_4$, $L_3$, $L_2$, $L_1$, $L_0$ as viewed from the side of most significant bit (MSB).

The column counter 523 is a 5 bit binary counter which operates in synchronism with a picture element clock. This counter also repeats counting of 32 counts in a fashion of 0. 1. 2. 3 ... 31, 0. 1. 2. 3 ... 31. The 5 bit output lines thereof are denoted by $C_4$, $C_3$, $C_2$, $C_1$, $C_0$ from the side of MSB.

Figure 17:
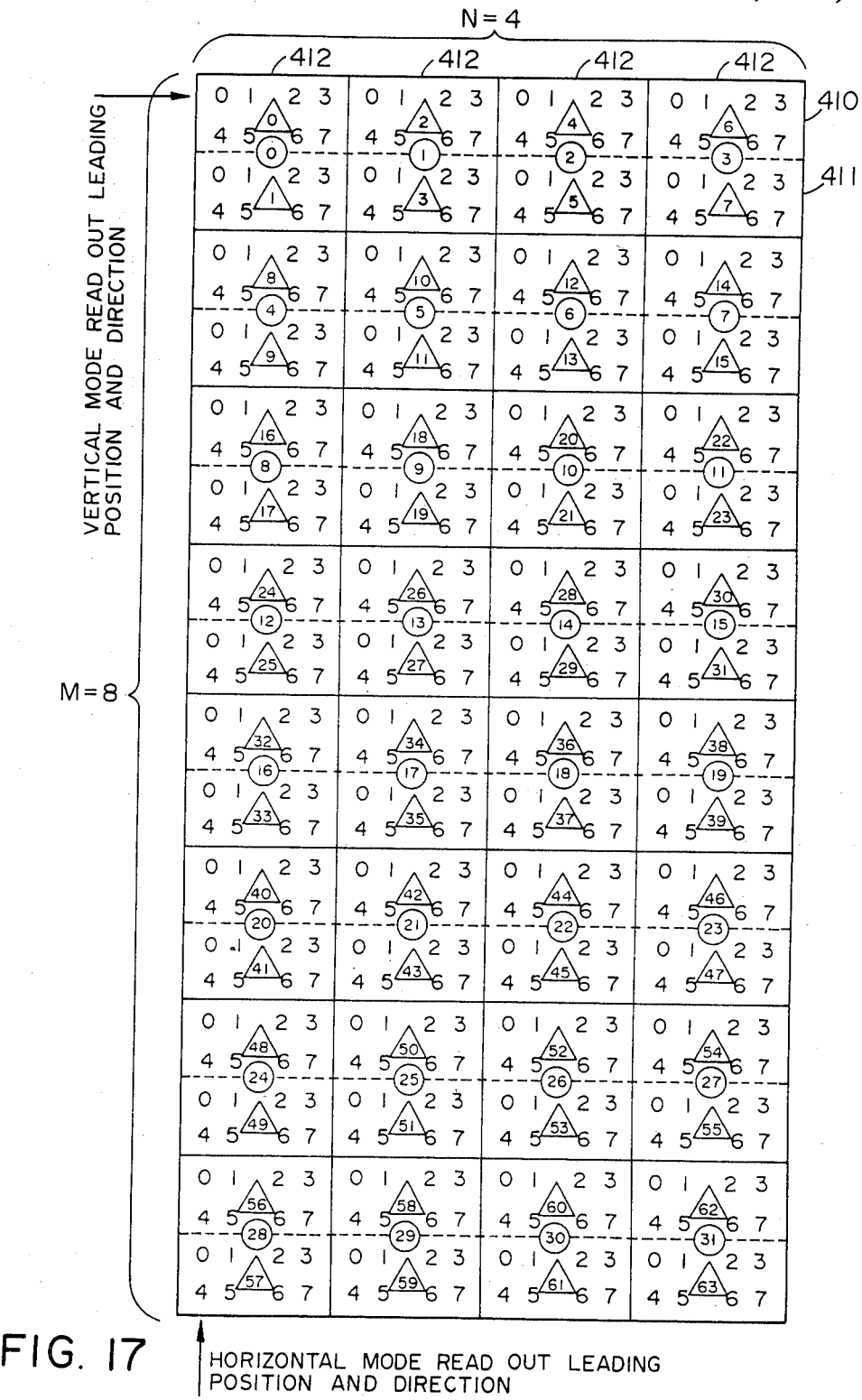
FIG. 17 shows a memory matrix group.
Figure 24:
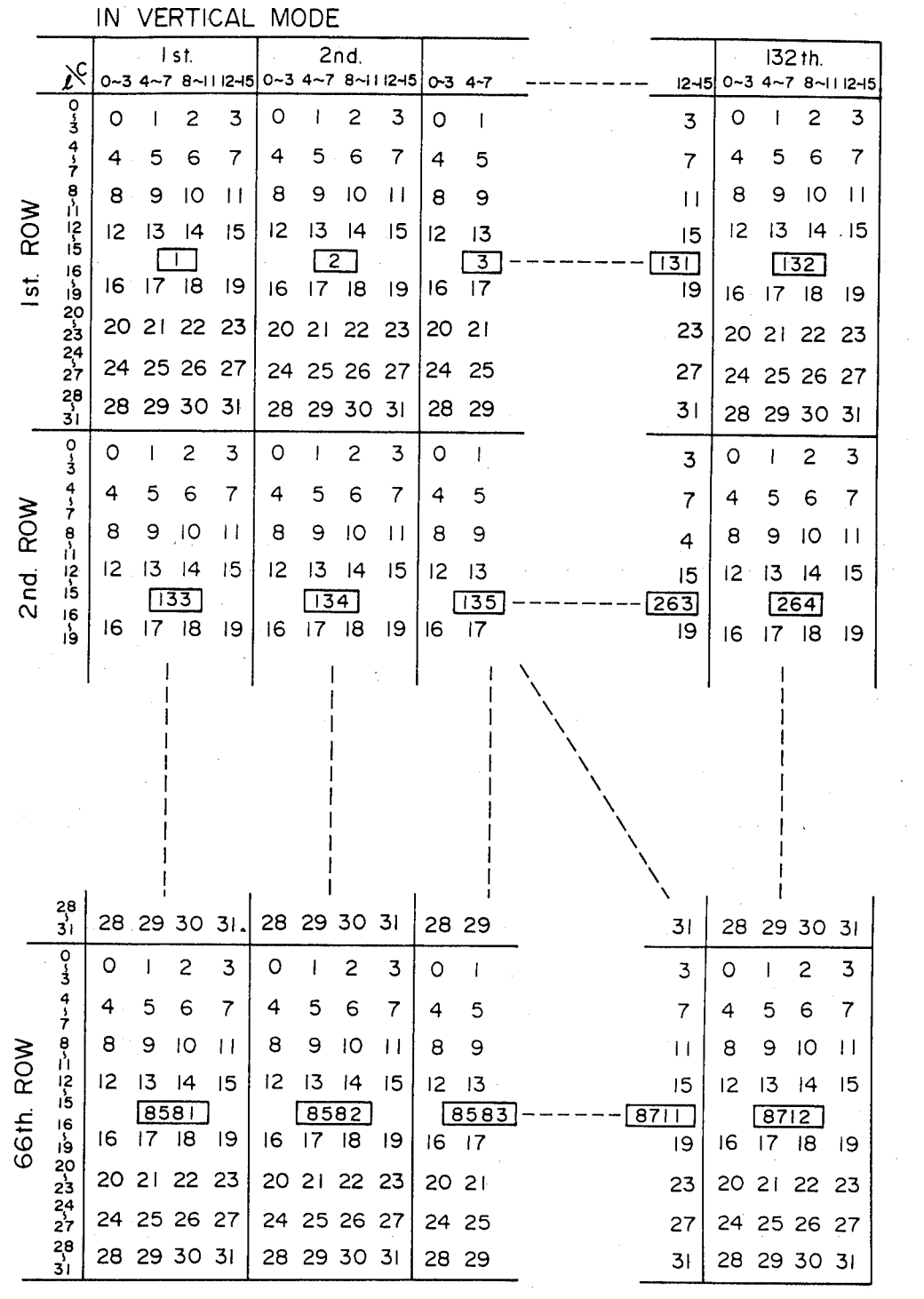

The address determination circuit 519 selects the output signals from the above counters by means of a vertical/horizontal mode signal and makes access to unit matrix memory in the sequence in accordance with the vertical and horizontal modes of memory matrix group shown in FIG. 17. Thus, let $A_4$, $A_3$, $A_2$, $A_1$, $A_0$ denote the outputs of the address determination circuit 519 as viewed from MSB side in FIG. 23, then data addresses of the unit matrix 412 relating to one character become accessible in the sequence of 0, 1, 2, 3, ..., 31 by determining that $A_4=L_4$, $A_3=L_3$, $A_2=L_2$, $A_1=C_3$, $A_0=C_2$ for the vertical mode. Considering the whole one page, this gives a form as shown in FIG. 24. In FIG. 24, c is column clock, l is row clock, 0-31 are data address of one character and the number given in □ is character number.

Figure 25B:
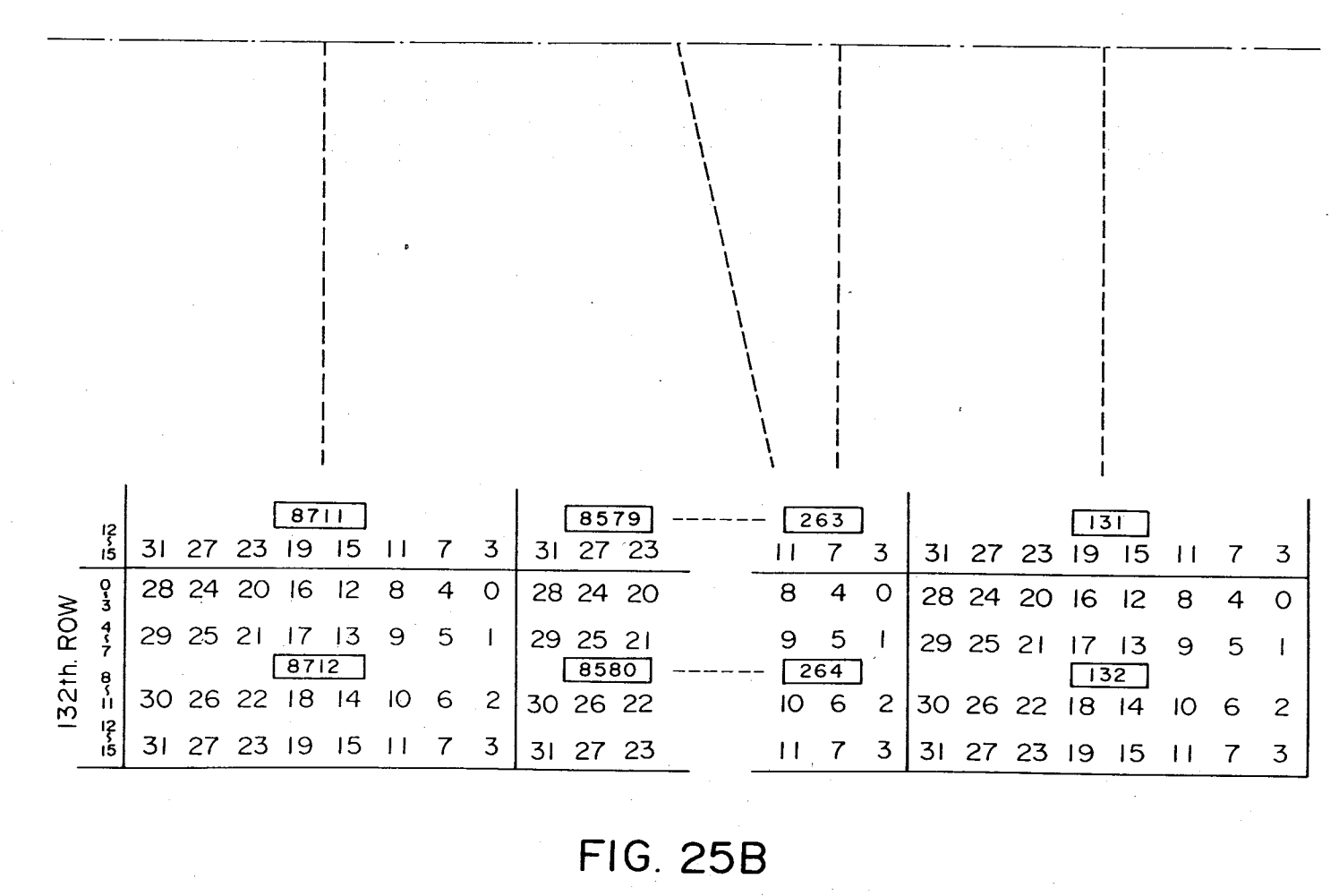
Figure 25:
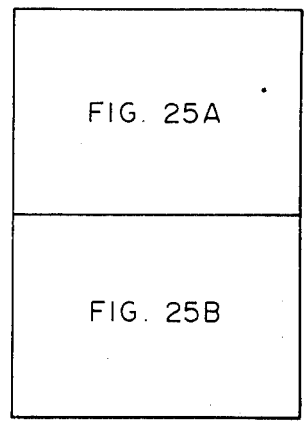
FIG. 25 shows how

For the horizontal mode, by determining that $A_4=\overline{C}_4$, $A_2=\overline{C}_2$, $A_1=L_3$, $A_0=L_2$, access to data addresses to unit matrix 412 relating to one character can be made in the sequence of 28, 24, 20, ..., 0, 29, 25 ..., 1, 30, 26, ..., 2, 31, 27, ..., 3. As the whole of one page, this gives a form as shown in FIG. 25.

The address determination circuit 519 comprises inverters $I_1$, $I_2$, $I_3$ and switches $S_0$, $S_1$, $S_2$, $S_3$, $S_4$. By a vertical/horizontal signal from the mode signal line 528, when in the vertical mode, $S_0$-$S_4$ are connected to the A side and when in the horizontal mode $S_0$-$S_4$ are connected to the B side so that the above signals $A_0$-$A_4$ can be obtained.

Figure 26:
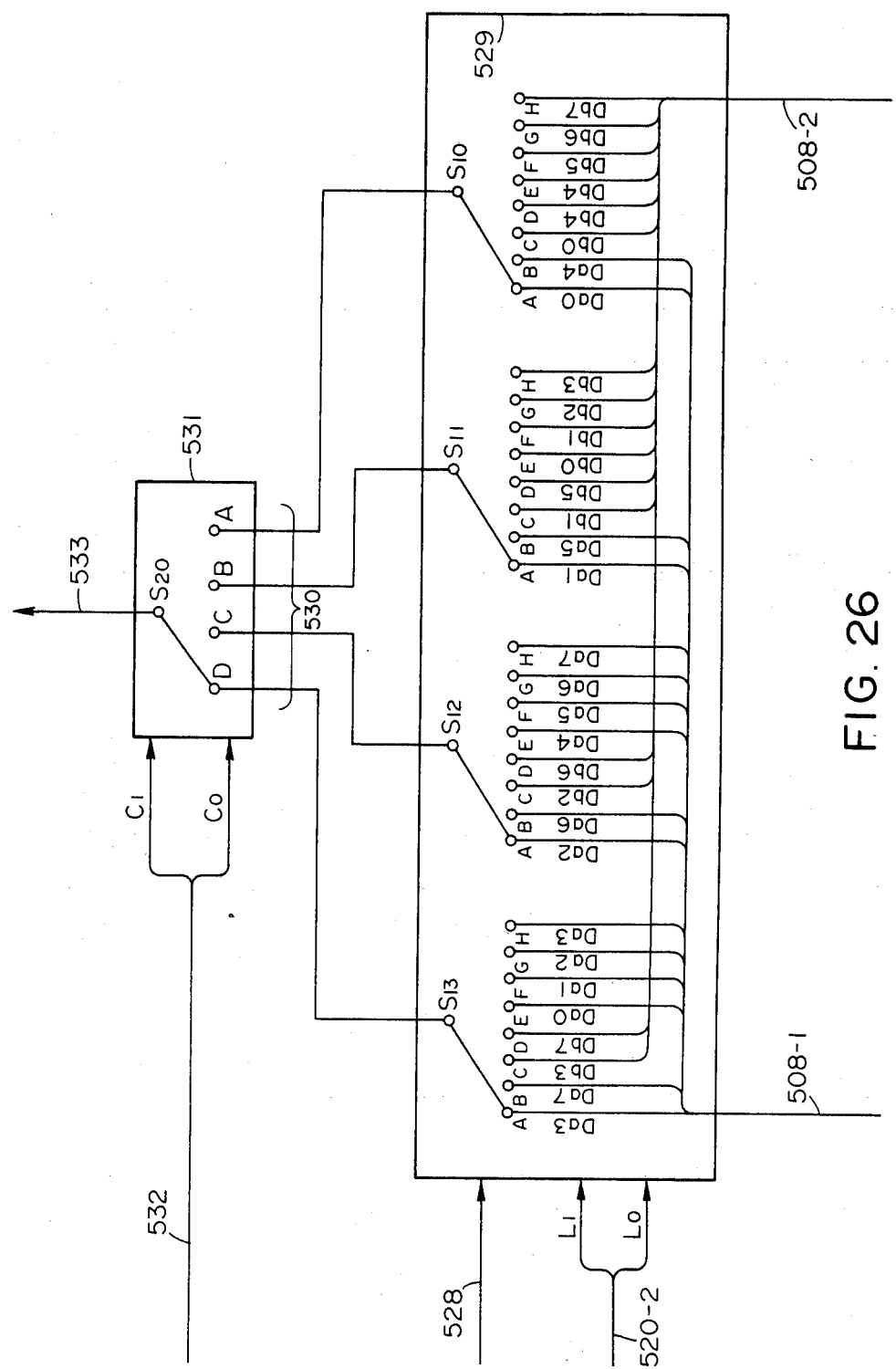
FIG. 26 shows a digit selector and its peripheral circuit.
Figures 27, 28:
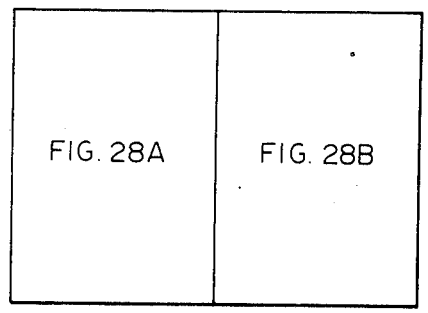
FIGS. 27-(1) and 27-(2) are truth tables for digit selection.
FIG. 28 shows how

The manner of operation of a digit selector is as follows:

Details of the digit selector are shown in FIGS. 26 and 27. Parallel 16 bit data are introduced into the digit selector (1) 529 from character memories 509 and 510 through buses 508-1 and -2. This means that 16 bits have access to one of the unit matrixes at the same time. By three control signals, that is, vertical/horizontal mode signal, row counter signals $L_1$ and $L_0$ obtained through lines 528 and 520-2, the internal switch circuits $S_{10}$-$S_{13}$ are driven to select data signals of 508-1 and -2. This operation of $S_{10}$-$S_{13}$ by the control signals is shown in a truth table of FIG. 27(1). The 4 bit data signal thus obtained is introduced into the second digit selector (2) 531 through bus 530. The second digit selector is composed of one single switch $S_{20}$ and is designed to select a particular 1 bit from the input data by means of lower 2 bit signals $C_1$ and $C_0$ introduced from the column counter through bus 532. This operation of switch $S_{20}$ is shown in FIG. 27(2). With this arrangement, in response to the column clock, digit selection for the vertical mode can be made in the sequence of $Da_0$, $Da_1$ ... $Da_3$, $Da_4$, ... $Da_7$, $Db_0$, $Db_1$, ..., $Db_7$ as to one unit matrix. For the horizontal mode, also in response to the column clock, digit selection can be made in the sequence of $Db_4$, $Db_0$, $Da_4$, $Da_0$, $Db_5$, $Da_1$, $Da_5$, ..., $Da_7$, $Da_3$ as to one unit matrix. In this manner, it is made possible to read out from the same memory either of character in the vertical mode shown in FIG. 20 and character in the horizontal mode shown in FIG. 21.

In the above, operation necessary for rotating a dot pattern has been described. The present invention also permits a further function of character size variation. Hereinafter, an embodiment thereof will be described. While the memory matrix group shown in FIG. 17 has been described particularly with reference to the case where the number of dots per character is 16 (horizontal)×32 (vertical) for the purpose of simplification of explanation, the number should not be considered to be unchangeable. Rather, the numbers M and N of unit matrixes in the directions of row and column can be changed to magnify or demagnify the size of the character produced. In the circuit shown in FIG. 22 employing the memory matrix group illustrated in FIG. 17, the column counter 523 issued an column end signal through line 527 every time after counting 16 column clocks because of 4×N where N=4. Similarly, the row counter 521 issued a row end signal through line 526 every time after counting 32 row clocks because of 4×M where M=8.

Figure 28A:
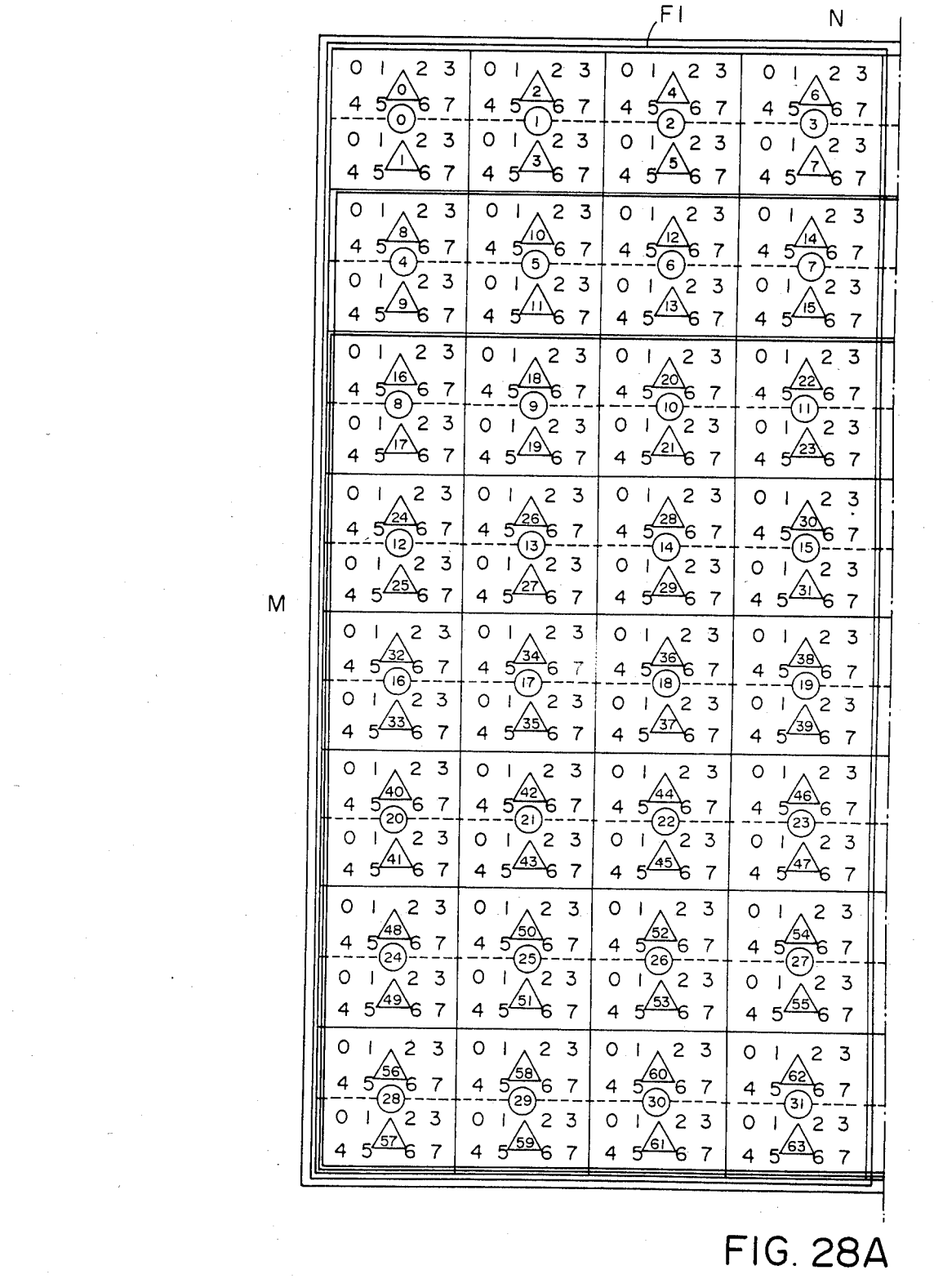
Figure 28B:
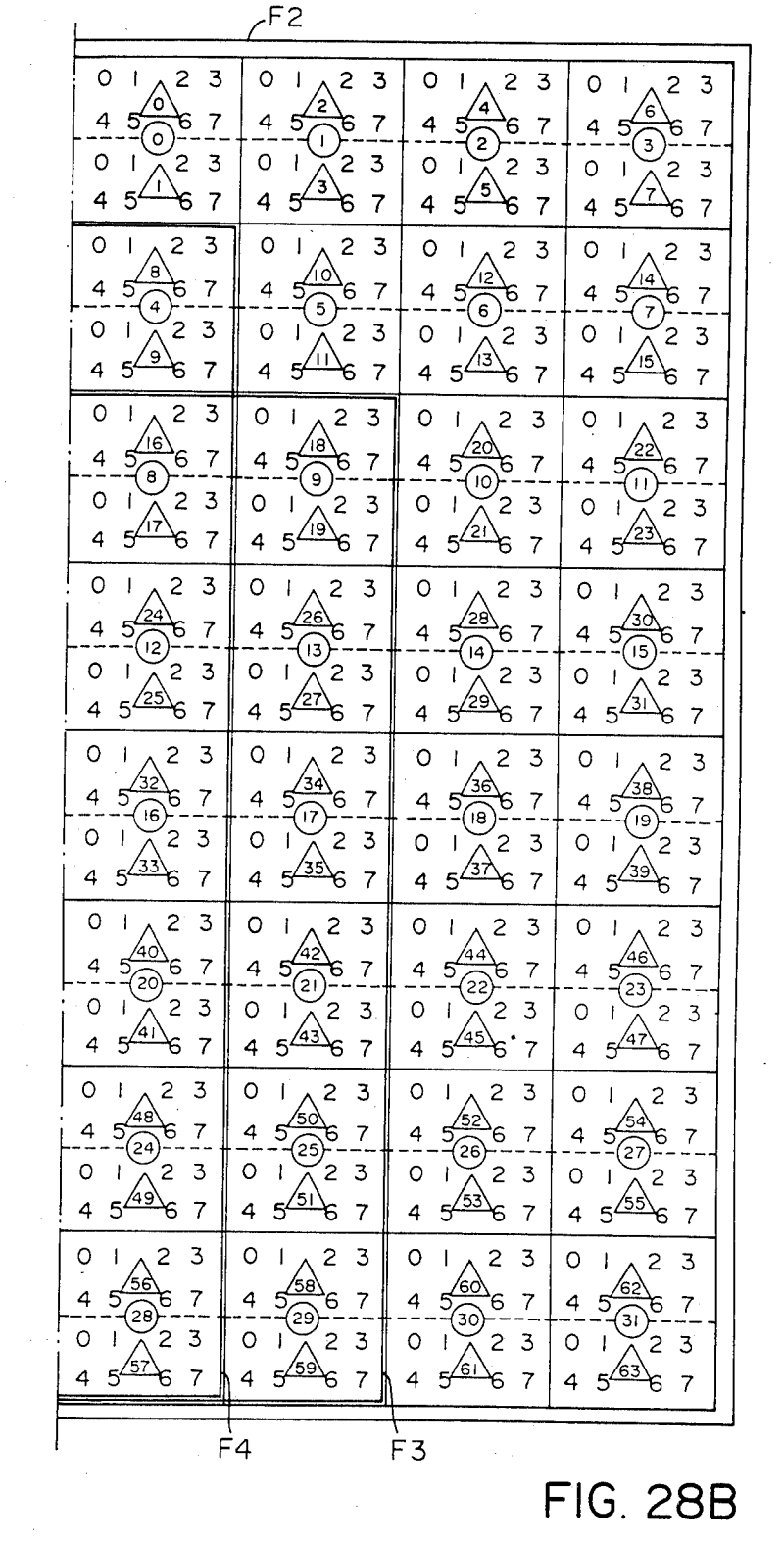

To describe the function of character size variation, the memory matrix group shown in FIG. 17 is doubled in the direction of columns. FIGS. 28A and 28B show the enlarged matrix group. In FIGS. 28A and 28B, if it is wished to set N=4 and M=8, then frame F1 is selected. The number of dots per character framed by Frame 1 will be 16×32 which is the same as that of FIG. 17. Therefore, in this case, there will be produced the same size of character as that produced by the FIG. 17 embodiment. If it is wished to change the setting to N=8 and M=8, then Frame 2 is selected. The number of character dots framed by Frame 2 now becomes 32×32. Therefore, in this case, the size of characters produced will be magnified to 32×32. In the same manner, a dot number of 24=24 is obtainable by selecting Frame 3 and 20×28 obtainable by Frame 4 to produce characters of the corresponding sizes respectively. Thus, any desired matrix group can be selected from a basic matrix group as shown in FIG. 28 by selecting values for M and N as desired using frames F1-F4 and other frames.

Figures 29, 29A:
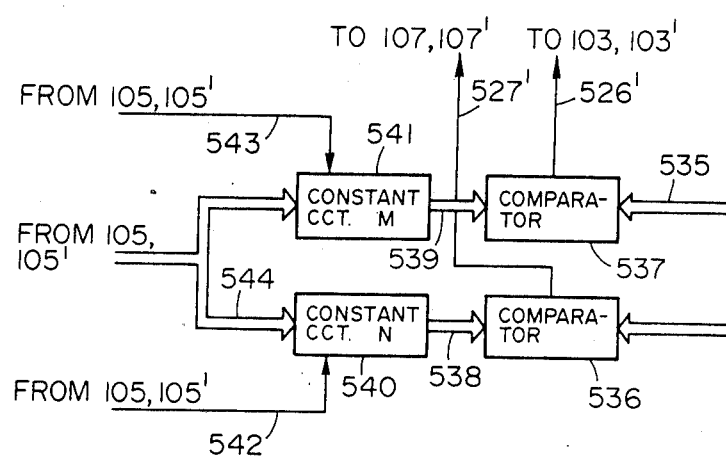
FIG. 29 shows how
FIGS. 29A and 29B are related.
Figure 29B:
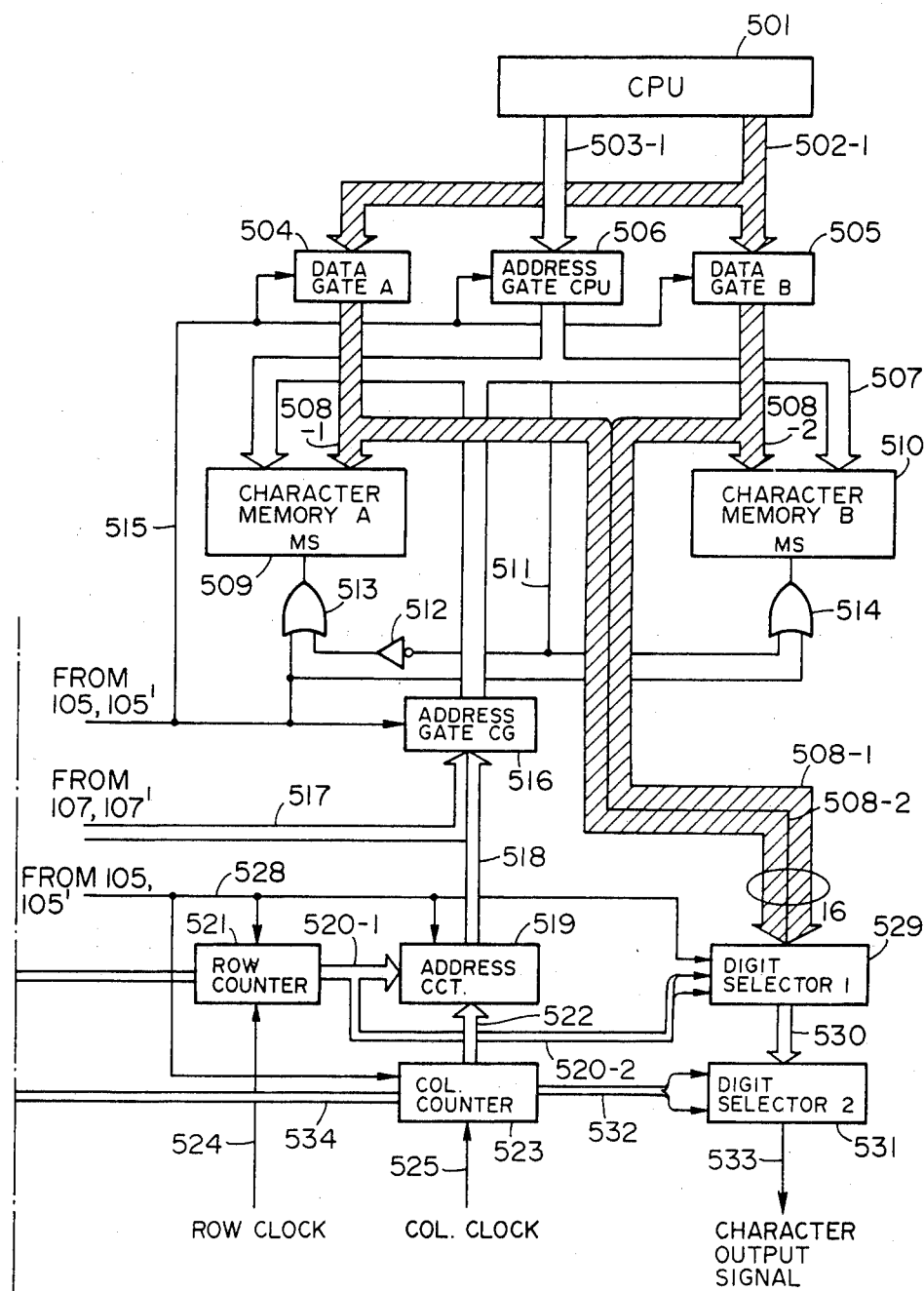

FIGS. 29A and 29B show a control block diagram of a character generator having the function for setting the values M and N. In FIGS. 29A and 29B, members having the same function as in FIG. 22 are designated by using the same reference numerals.

To the row counter 521 there is provided a constant circuit 541 which puts out a certain numerical value M and to the column counter 532 there is provided a constant circuit 540 which puts out a certain numerical value N. Of the outputs $L_0-L_4$ of the row counter 521 three outputs $L_2$, $L_3$ and $L_4$ are introduced into a comparator 537 through bus 535. The comparator 537 issues a row end signal through line 526' when coincidence occurs between the output from the constant circuit 541 and that from the row counter 521, and then it obtains a signal for selecting the character of the next row.

Similarly, of the outputs $C_0-C_4$ of the column counter 523, three outputs $C_4$, $C_3$ and $C_2$ are introduced into a comparator 536 through bus 534. When coincidence occurs between the output from the constant circuit 540 and that from the column counter 523, the comparator 536 issues a column end signal onto line 527' and receives a signal for selecting character of the next line.

To supply the constants M and N, a data bus 544 extends to constant circuits from the second control 105, 105' (FIGS. 4 and 7). 542 and 543 are timing signal lines for selecting the constant circuits 540 and 541 respectively.

In this manner, any desired matrix group can be selected from a basic matrix group as shown in FIGS. 28A and 28B by setting M and N to desired values at the second control part 105, 105' and characters of any desired size can be produced in accordance with instruction given by the second control.

This change in size can be done for every page, for every line and for every character by applying a size index to the constant circuits 540 and 541 every page, every line or every character.

By using the above arrangement, the flexibility of the character output system can be improved remarkably. At present there are used different forms of character output in different technical fields. For example, differences are found in number of characters/line, number of lines/page and spacing (proportional spacing and uniform spacing). According to the above embodiment, the character output apparatus can be accommodated to such difference adequately in a very simple manner by changing the number of dots in unit of page or for every character.

While the invention has been particularly shown and described with reference to preferred embodiments thereof, it will be understood by those skilled in the art that the foregoing and other changes in form and details can be made therein.

For example, i and j can also take other values than that described above. Also, the addresses of unit matrix shown in FIG. 17 may be altered by allotting addresses in a direction different from that in FIG. 17 without departing from the scope of the invention.

Further, the method of access to unit matrix is never limited to that of simultaneous access to same address as shown in the above embodiments. Any suitable method may be used provided that it allows treatment of a plural number of data within one unit matrix as same address data. For example, such time division method may be used according to which 16 bit data of unit matrix is further subdivided into 4 bit units and makes access to the 4 bit unit at a higher speed, for example, 4 times higher speed that the required unit matrix cycle time so as to complete a readout of 16 bits at every unit matrix cycle time.

As understood from the foregoing, the present invention according to which a character dot pattern is formed by a plural number of unit matrix memories brings forth many advantages over the prior art ones.

For a conventional vertical-horizontal mode change-over system there were required complicated peripheral circuits to change over a horizontal line to a vertical line and vice versa. In contrast, the apparatus according to the present invention in which a pattern is divided into unit matrixes, enables use of any structure of memory including various common memories such as 4 bit memory, 8 bit memory (in case of the above embodiments) and 16 bit memory which is contributive to further reduction of cost. Another advantage is found in that access time to memory can be determined at will depending upon the structure of unit matrix then used, which allows an easy access to memories and also use of a much more simplified peripheral circuit. The angle of image rotation is never limited to 90° only as used in the embodiments. It will be readily understood that a character pattern rotated by 270° can be obtained by starting reading from the direction indicated by arrow 203 in FIG. 1 and a 180° rotated character pattern can be obtained by starting reading from the direction indicated by arrow 204.

As output apparatus, an electrophotographic recording apparatus employing a laser beam has been particularly shown and described in the above embodiments. However, it should be understood that the present invention is equally applicable to other types of apparatus including electrophotographic apparatus employing an optical fiber tube (OFT) or a stylus electrode in place of the laser beam, and ink jet or cathode ray tube (CRT) output system.

What we claim is:
1. Data output apparatus, comprising:
   first memory means for storing image data in coded form in row by row format;

control means for rearranging said coded image data in row by row format as coded image data in column by column format;

second memory means for storing said coded image data rearranged by said control means in said column by column format; and output means for putting out said coded image data in said column by column format from said second memory means; and pattern generating means responsive to said coded image data in said column by column format put out by said output means from said second memory means, for generating a dot pattern represented by said coded image data in said column by column format.

2. Data output apparatus according to claim 1, wherein said first memory means includes page memory parts each of which can store an amount of data equivalent to one page.

3. Data output apparatus according to claim 2, wherein said apparatus further comprises means for preparing one of said page memory parts to receive data input thereto while data stored in another page memory part is being put out therefrom.

4. Data output apparatus according to claim 1, wherein said second memory means is also capable of storing coded image data in said row by row format and wherein said control means includes means for determining whether data stored in said first memory means are to be arranged for storage within said second memory means in said row by row format or in said column by column format.

5. Data output apparatus according to claim 1, wherein said second memory means includes column memory parts each of which can store an amount of data equivalent to one column.

6. Data output apparatus according to claim 5, wherein said control means includes means for preparing one of said column memory parts to receive data input thereto while data stored in another column memory part is being put out therefrom.

7. Data output apparatus according to claim 1, wherein said pattern generating means includes selecting means for selecting a read out sequence of said dot pattern.

8. Data output apparatus according to claim 7, wherein said second memory means is also capable of storing coded image data in said row by row format and wherein said control means includes means for determining whether data stored in said first memory means are to be arranged for storage within said second memory means in said row by row format or in said column by column format.

9. Data output apparatus according to claim 8, wherein said selecting means selects the read out sequence of said dot pattern depending upon the output from said determining means.

10. Data output apparatus according to claim 1, wherein said output means includes recording means for recording said dot pattern.

11. Data output apparatus according to claim 10, wherein said dot pattern generating means generates a dot pattern in time series and said recording means records said dot pattern in time series.

12. Data output apparatus according to claim 11, wherein said recording means is a recording apparatus employing a laser beam and further comprising means for modulating said laser beam controlled by the output from said pattern generating means.

13. Data output apparatus, comprising:

first memory means for storing character code signals;

second memory means for storing said character code signals in said first memory means in row by row format or in column by column format;

means for generating an arrangement control signal indicating the direction of characters;

arrangement control means for determining whether said character code signals are to be stored in said second memory means in said column by column format or in said row by row format and for determining an arrangement order of said code signals based on the arrangement control signal generated by said signal generating means; and character generating means for generating a character dot pattern in accordance with said code signals within said second memory means, said character generating means including a pattern memory part for storing said dot pattern and pattern control means for controlling the generation sequence said dot pattern generated by said character generating means in accordance with the determination made by said arrangement control means.

14. Data output apparatus according to claim 13, wherein said pattern control means includes an address control part for controlling the selection of the address of said pattern memory part in accordance with the determination made by said arrangement control means and a selection part for selecting the read out sequence of dot data of said pattern memory part in accordance with the determination made by said arrangement control means.

15. Data output apparatus according to claim 14, further comprising a recording apparatus for recording the output of said character generating means on a recording medium by scanning said recording medium in a primary scanning direction and a secondary scanning direction substantially perpendicular to the primary scanning direction, and wherein said address control part and said selection part select said address and and the readout sequence of said dot data depending upon the recording position in the primary scanning direction and the secondary scanning direction of said recording medium respectively.

16. Data output apparatus according to claim 15, wherein said recording apparatus includes row counter means for counting the position in the secondary scanning direction to determine said recording position.

17. Data output apparatus according to claim 16, wherein said character generating means includes column counter means for counting the position in the primary scanning direction.

18. Data output apparatus according to claim 15, wherein said recording apparatus is a recording apparatus employing a laser beam.

19. Data output apparatus according to claim 18, wherein said recording apparatus includes means for deflecting said laser beam to carry out the primary scanning and detection means for detecting a certain determined position in the primary scanning direction and wherein said row counter means counts the outputs from said detection means.

20. Data output apparatus according to claim 19, wherein said character generating means includes column clock generating means for generating column clock signals in response to the output from said detection means to determine the position in the primary scanning direction.

21. A character pattern generator, comprising:
memory means for storing a dot pattern therein to form a character as a dot matrix, said memory means having a memory area for each character formed as a dot matrix, each area being divided into a plurality of unit matrixes, each of said unit matrixes storing plural dot data, said dot data of each unit matrix being simultaneously accessible;
address selection means for sequentially selecting said unit matrixes, along a readout direction selected from a plurality of readout directions, for the sequential readout of said unit matrixes; and
additional selection means for selecting said dot data from each of said unit matrixes sequentially selected by said address selection means in accordance with the readout direction.

22. A character pattern generator according to claim 21, which further comprises recording means for recording characters on a recording medium by means of the output signal from said additional selection means, said recording means including scanning means for scanning the recording medium in a primary scanning direction and a secondary scanning direction substantially perpendicular to the primary scanning direction.

23. A character pattern generator according to claim 21, wherein the number of dot data with each said unit matrix measured in the row direction and that measured in the column direction are equal to each other.

24. A character pattern generator according to claim 21 or 23, wherein the number of dot data within each said unit matrix measured in the row direction and that measured in the column direction are each a power of 2.

25. A character pattern generator according to claim 20, wherein the number of unit matrixes within each said area measured in the row direction and that measured in the column direction are each a power of 2.

26. A character pattern generator according to claim 22, wherein said address selection means and said additional selection means select said unit matrixes and said dot data in accordance with the recording position in the primary and secondary scanning directions of said scanning means respectively.

27. A character pattern generator according to claim 26, wherein said recording means includes row counter means for counting the position in the secondary scanning direction to determine said recording position.

28. A character pattern generator according to claim 27, which further comprises column counter means for counting the position in the primary scanning direction.

29. A character pattern generator according to claim 28, wherein said recording means is a recording apparatus employing a laser beam.

30. A character pattern generator according to claim 29, wherein said recording means includes means for deflecting said laser beam to carry out the primary scanning and detection means for detecting a certain determined position in the primary scanning direction and wherein said row counter means counts the outputs from said detection means.

31. A character pattern generator according to claim 30, which further comprises column clock generating means for generating column clock signals in response to the output from said detection means to determine the position in the primary scanning direction.

32. A character pattern generator according to claim 21, which further comprises setting means for determining the number of unit matrixes within each said area.

33. A character pattern generator according to claim 32, wherein said setting means includes row direction setting means for determining the number of unit matrix memories within said unit matrix group measured in the row direction and column direction constant means for determining the number of unit matrix memories measured in the column direction.

34. A character pattern generator, comprising:
first and second memory parts each having addresses for storing character dot patterns therein that form a character as a dot matrix of dot data;
an address bus connected in common to said memory parts for appointing addresses in said memory parts;
first and second output data buses each provided on an associated one of said first and second memory parts for putting out the dot data stored at the address appointed by said address bus, wherein adjacent portions of dot data comprising a dot pattern in said first and said second memory parts can be simultaneously addressed by the address bus to put out data respectively from said output data buses; and
output means for selectively putting out the dot data put out from said output data buses.

35. A character pattern generator according to claim 37, wherein said first and said second memory parts have a common address for reading out and storing mutually adjacent portions of the dot pattern of a character.

36. A character pattern generator according to claim 35, which further comprises entry means for entry of the dot pattern into said memory parts.

37. A character pattern generator according to claim 34, wherein appointments of the address of said first and second memory parts when dot data is entered into said memory parts are different from each other but appointments of the address of said first and said second memory parts when dot data is read out are the same as each other.

38. A character pattern generator comprising:
memory means for storing a code signal for a character;
pattern memory means for storing a dot pattern of a character corresponding to said code signal, said stored dot pattern of the character being divided for storage into a plural number of memory cells each including dot data, said dot data stored in each said memory cell being simultaneously readable;
means for generating a direction signal indicating the direction of a character;
first control means for controlling and for changing the sequence of access to said pattern by said character code signal in accordance with the direction signal;
second control means for controlling and for changing the sequence of selection of said memory cells in accordance with the the direction signal; and
third control means for controlling the sequence of selection of a plurality of dot data in accordance with the direction signal.

39. A character pattern generator comprising:
pattern memory means for storing dot patterns of plural characters, and having memory cells corresponding to unit matrixes into which the dot pattern of each character is divided, each unit matrix being for storing a plurality of dot data;

character code generating means sequentially generating character codes for designating one of the dot patterns of said plural characters stored in said pattern memory means;

first signal generating means for supplying a signal indicating the number of said unit matrixes constituting the dot pattern of an arbitrary character code generated by said character code generating means;

second signal generating means for supplying a signal indicating the number of unit matrixes in the course of output from said pattern memory means for a character; and control means for comparing the signal supplied from said first signal generating means with the signal supplied from said second signal generating means and switching said character code generating means from one character code to another in accordance with said comparison.

40. A character pattern generator according to claim 39, wherein said first signal generating means comprises respective means for determining the number in the row direction and the number in the column direction of the unit matrixes constituting the dot pattern of an arbitrary character code generated by said character code generating means.

41. A character pattern generator according to claim 39, further comprising recording means for recording the output signals from said pattern memory on a recording member, said recording means including means for scanning the recording member in a main scanning direction and an auxiliary scanning direction substantially perpendicular to the main scanning direction.

42. A character pattern generator according to claim 41, wherein said recording means is a recording apparatus employing a laser beam.

43. A character pattern generator according to claim 41, wherein said signal generating means includes row counting means for counting the recording position in the auxiliary scanning direction on said recording member and column counting means for counting the recording position in the main scanning direction on said recording member.

* * * * *

UNITED STATES PATENT AND TRADEMARK OFFICE
CERTIFICATE OF CORRECTION

PATENT NO. : 4,566,002

DATED : January 21, 1986

INVENTOR(S) : Genmei Miura, et al.

It is certified that error appears in the above-identified patent and that said Letters Patent is hereby corrected as shown below:

Column 1, line 58, change "character obtained by the characters generator" to --characters obtained by the character generator--.

Column 2, line 12, change "above mentioned" to --above-mentioned--; and line 26, change "page data." to --page data is occurring.--.

Column 3, line 21, change "variation; and" to --variation;--;

line 22, change "are related;" to --are related; and--;

line 23, change "block diagram" to --block diagrams--; and line 35, change "307 a" to --307, a--.

Column 4, lines 28-29, change "unfavourable" to --unfavorable--.

UNITED STATES PATENT AND TRADEMARK OFFICE
CERTIFICATE OF CORRECTION

PATENT NO. : 4,566,002

DATED : January 21, 1986

INVENTOR(S) : Genmei Miura, et al.

It is certified that error appears in the above-identified patent and that said Letters Patent is hereby corrected as shown below:

Column 7, line 52, change "first control 204" to --first control 102'--.

Column 8, line 5, change "form a shown" to --form as shown--; and line 59, change "interpretting" to --interpreting--.

Column 10, line 10, change "Motoroller" to --Motorola--; and line 64, change "MRK" to --MARK--.

Column 11, line 17, change "LINSKIP" to --LNSKIP--.

Column 14, line 43, change "horizontal mode" to --HORIZONTAL MODE--.

Column 16, line 7, change "under going" to --undergoing--.

UNITED STATES PATENT AND TRADEMARK OFFICE
CERTIFICATE OF CORRECTION

PATENT NO. : 4,566,002

DATED : January 21, 1986

INVENTOR(S) : Genmei Miura, et al.

It is certified that error appears in the above-identified patent and that said Letters Patent is hereby corrected as shown below:

Column 17, line 60, change "preferrable" to --preferable--.

Column 19, line 8, change "of a data" to --of data--;
line 9, change "of RAM" to --of a RAM--; and
line 65, change "in RAM." to --in a RAM.--.

Column 20, line 19, change "time at operation" to --time of operation--.

Column 22, line 7, change "data address" to --data addresses--; and
line 67, change "an column" to --a column--.

Column 23, line 19, change "24=24" to --24x24--; and
line 48, change "selecting character" to --selecting the character--.

Column 24, line 26, change "speed that the" to --speed than the--.

UNITED STATES PATENT AND TRADEMARK OFFICE
CERTIFICATE OF CORRECTION

PATENT NO. : 4,566,002

DATED : January 21, 1986

INVENTOR(S) : Genmei Miura, et al.

It is certified that error appears in the above-identified patent and that said Letters Patent is hereby corrected as shown below:

Column 26, line 23, change "sequence said" to --sequence of said--; and
lines 43-44, change "address and and the" to --address and the--.

Column 27, line 55, change "28," to --27,--.

Column 28, line 30, change "37," to --34,--;
line 35, change "35," to --34,--; and
line 62, change "with the the direction" to --with the direction--.

Signed and Sealed this

Thirteenth Day of January, 1987

Attest:

DONALD J. QUIGG

Attesting Officer

Commissioner of Patents and Trademarks